United States Patent
Yemdji et al.

(10) Patent No.: US 9,768,829 B2
(45) Date of Patent: Sep. 19, 2017

(54) METHODS FOR PROCESSING AUDIO SIGNALS AND CIRCUIT ARRANGEMENTS THEREFOR

(71) Applicants: Christelle Yemdji, Antibes (FR); Nicholas Evans, Valbonne (FR); Christophe Beaugeant, Mouans Sartoux (FR); Ludovick Lepauloux, Cannes (FR)

(72) Inventors: Christelle Yemdji, Antibes (FR); Nicholas Evans, Valbonne (FR); Christophe Beaugeant, Mouans Sartoux (FR); Ludovick Lepauloux, Cannes (FR)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 413 days.

(21) Appl. No.: 13/676,142

(22) Filed: Nov. 14, 2012

(65) Prior Publication Data

US 2013/0301840 A1    Nov. 14, 2013

Related U.S. Application Data

(60) Provisional application No. 61/645,652, filed on May 11, 2012.

(51) Int. Cl.
*H04B 3/20* (2006.01)
*H04M 9/08* (2006.01)

(52) U.S. Cl.
CPC .............. *H04B 3/20* (2013.01); *H04M 9/082* (2013.01)

(58) Field of Classification Search
CPC ............ H04B 3/20; H04B 3/23; H04B 3/234; H04B 3/237; H04M 9/082; H04M 9/08
(Continued)

(56) References Cited

U.S. PATENT DOCUMENTS 6,925,176 B2 *   8/2005   Myllyla ............... H04M 9/082
                                                379/406.05
7,003,099 B1 *   2/2006   Zhang .................. H04M 9/082
                                                379/388.02
(Continued)

FOREIGN PATENT DOCUMENTS

CA   EP 1978649 A2 * 10/2008 ............ H04M 9/082
CN       1809105 A       7/2006
(Continued)

OTHER PUBLICATIONS

E. Haensler, G. Schmidt, "Hands-free telephones—joint control of echo cancellation and postfiltering", Signal Porcessing 80 (2000), pp. 2295-2305.
(Continued)

*Primary Examiner* — William A Jerez Lora
(74) *Attorney, Agent, or Firm* — Viering, Jentschura & Partner mbB

(57) ABSTRACT

A method for processing audio signals is provided comprising outputting an audio signal; receiving the output audio signal via a first receiving path as a first received audio signal; receiving the output audio signal via a second receiving path as a second received audio signal; determining an echo suppression gain based on the first received audio signal and the second received audio signal; and filtering echo suppression of the audio signal based on the first received audio signal and the echo suppression gain.

31 Claims, 15 Drawing Sheets

(58) Field of Classification Search
USPC .................. 381/58, 66, 71.11, 56, 71.1, 71.4
See application file for complete search history.

(56) References Cited

U.S. PATENT DOCUMENTS

| | | | |
|---|---|---|---|
| 7,035,415 B2 | 4/2006 | Belt et al. | |
| 7,054,437 B2* | 5/2006 | Enzner | H04M 9/082 370/289 |
| 8,023,641 B2* | 9/2011 | Rahbar | H04M 9/082 370/289 |
| 8,855,327 B2 | 10/2014 | Tanaka et al. | |
| 2006/0153360 A1 | 7/2006 | Kellermann et al. | |
| 2007/0165879 A1 | 7/2007 | Deng et al. | |
| 2008/0031466 A1 | 2/2008 | Buck et al. | |
| 2008/0247536 A1* | 10/2008 | Rahbar | H04M 9/082 379/406.08 |
| 2009/0089054 A1* | 4/2009 | Wang et al. | 704/233 |
| 2009/0316923 A1* | 12/2009 | Tashev | H04M 9/082 381/66 |
| 2010/0215184 A1* | 8/2010 | Buck | H04M 9/082 381/66 |
| 2011/0211706 A1* | 9/2011 | Tanaka et al. | 381/66 |

FOREIGN PATENT DOCUMENTS

| | | |
|---|---|---|
| CN | 101015001 A | 8/2007 |
| CN | 101778183 A | 7/2010 |
| CN | 102204276 A | 9/2011 |
| EP | 1538867 A1 | 6/2005 |
| WO | 2006027707 A1 | 3/2006 |

OTHER PUBLICATIONS

C. Yemdji et al., "Efficient low delay filtering for residual echo suppression", in Proc. European Signal Processing Conference (EUSIPCO), Aalborg, Denmark, Aug. 2010, 5 pages.

S. Gannot et al., "Signal enhancement using beamforming and nonstationarity with applications to speech", in IEEE Transactions on signal processing, vol. 49, No. 8, Aug. 2001, pp. 1614-1626.

S. Haykin, "Adaptive Filter Theory", 4th edition, Prentice Hall, 2002, pp. 328-331.

S. Gannot et al., "Adaptive beamforming and postfiltering", Springer Handbook of Speech Processing, 2008, pp. 945-978.

M. Jeub et al., "Robust dual-channel noise power spectral density estimation", in Proc. European Signal Processing Conference (EUSIPCO), Barcelona, Spain, Aug.-Sep. 2011, pp. 2304-2308.

O. Shalvi et al., "System identification using nonstationary signals", in IEEE Transactions on signal processing, vol. 44, No. 8, Aug. 1996, pp. 2055-2063.

Chinese Office Action (8 pages) in the Chinese application No. 2013/028,852,8 dated Nov. 26, 2014 with English Translation (17 pages) (for reference purpose only).

Office action received for German Patent Application No. 10 2013 104 841.2 mailed on Jun. 2, 2015, 7 pages of office action and 5 pages of English translation.

Office Action received for the corresponding CN Patent Application 201310281852.8, dated Mar. 18, 2016, 12 pages of Office Action and 17 pages of English translation.

* cited by examiner

METHODS FOR PROCESSING AUDIO SIGNALS AND CIRCUIT ARRANGEMENTS THEREFOR

CROSS-REFERENCE TO RELATED APPLICATION

This application claims priority to U.S. Provisional Patent Application Ser. No. 61/645,652, which was filed May 11, 2012, and is incorporated herein by reference in its entirety.

TECHNICAL FIELD

The present disclosure relates to methods for processing audio signals and circuit arrangements for processing audio signals.

BACKGROUND

In physics, echo may be defined as the replica produced by the reflection of a wave in its surrounding environment. Such phenomenon may occur in speech telecommunications. In a telephone terminal, acoustic echo is due to the coupling between the loudspeaker and the microphone of the terminals. As a consequence, the microphone of the telephone not only contains the useful speech signal but also contains echo. If no processing is done on the microphone path, the echo signal as well as the near-end speech signals are transmitted to the far-end speaker and the far-end speaker hears a delayed version of his/her own voice. The annoyance due to hearing his/her own voice increases as the level of the echo signal is high and as the delay between the original signal and its echo is high.

In order to guarantee a good speech quality, some processing may be implemented on the microphone path before the transmission can take place. Acoustic echo cancellation algorithms have been largely investigated in the recent years. Approaches to acoustic echo cancellation may include an adaptive filter followed by an echo postfilter. The adaptive filter produces a replica of the acoustic path. This echo path estimate is then used to estimate the echo signal that is picked up by the microphone. In practice, because of mismatch between the echo path and its estimate, typically, some residual echo subsists at the output of the adaptive filter. A postfilter is often used to render echo inaudible. Echo postfilters may include attenuation being gain applied to the error signal from the adaptive echo cancelling. For better double talk performances, this attenuation can be computed in the subband or frequency domain. Nevertheless, performances of single channel echo cancellation may still be limited as there is typically a trade-off between echo suppression during echo-only periods and low level distortion of near-end speech during double-talk periods.

Mobile terminals have historically been designed with one microphone. Hence echo postfiltering solutions used in mobile terminals have been designed and optimized on the base of one microphone observation. Additionally, these solutions may have limited performance in case of low near-end signal to echo ratio (i.e. high echo compared to near-end speech). This limited performance may result in high distortions in the processed near-end speech signals during double-talk periods and therefore in bad communications quality.

Moreover, the single channel echo postfiltering problem has been tackled for decades now and there appears to be no more room for major improvements regarding solutions to the echo postfilter, especially for mobile terminals case where the computational complexity is somehow limited (in comparison to video conferencing terminals for example).

Thus, efficient methods of echo postfiltering or echo suppression are desirable.

SUMMARY

A method for processing audio signals is provided including outputting an audio signal; receiving the output audio signal via a first receiving path as a first received audio signal; receiving the output audio signal via a second receiving path as a second received audio signal; determining an echo suppression gain based on the first received audio signal and the second received audio signal; and filtering echo suppression of the audio signal based on the first received audio signal and the echo suppression gain.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

The following detailed description refers to the accompanying drawings that show, by way of illustration, specific details and aspects in which the invention may be practiced. These aspects are described in sufficient details to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects.

Approaches to improve speech quality in mobile terminals may include the use of multi-microphone terminals. Multi-microphone terminals may advantageously provide spatial information on the near-end acoustic environment.

In some of the following examples, the dual-channel microphone echo problem is specifically addressed. The adaptive echo cancellation problem may still be solved with classic (or standard) adaptive filters, for example, the normalised least mean squares (NLMS) filters, in particular, two adaptive filters (i.e., one for each microphone path) may be used.

Dual channel echo postfiltering may be provided.

For this the postfilter may use the multi-channel information to compute the power spectral density (PSD) and the echo suppression gains that are applied on one of the error signals to achieve residual echo suppression. In various embodiments, the multi-channel architecture may not necessarily require any beamforming and may keep a moderate computational complexity compared to classic (or standard) single channel echo postfiltering while improving echo suppression performance.

Any beamforming methods may be used in order to improve spatial information.

The dual-channel postfilter may be extended so as to be used with one adaptive filter instead of two. The adaptive filter may be placed on the microphone path on which the echo postfiltering takes place. This may reduce the computational complexity of the echo processing scheme while gaining the advantage of the dual-channel architecture.

Figure 1:
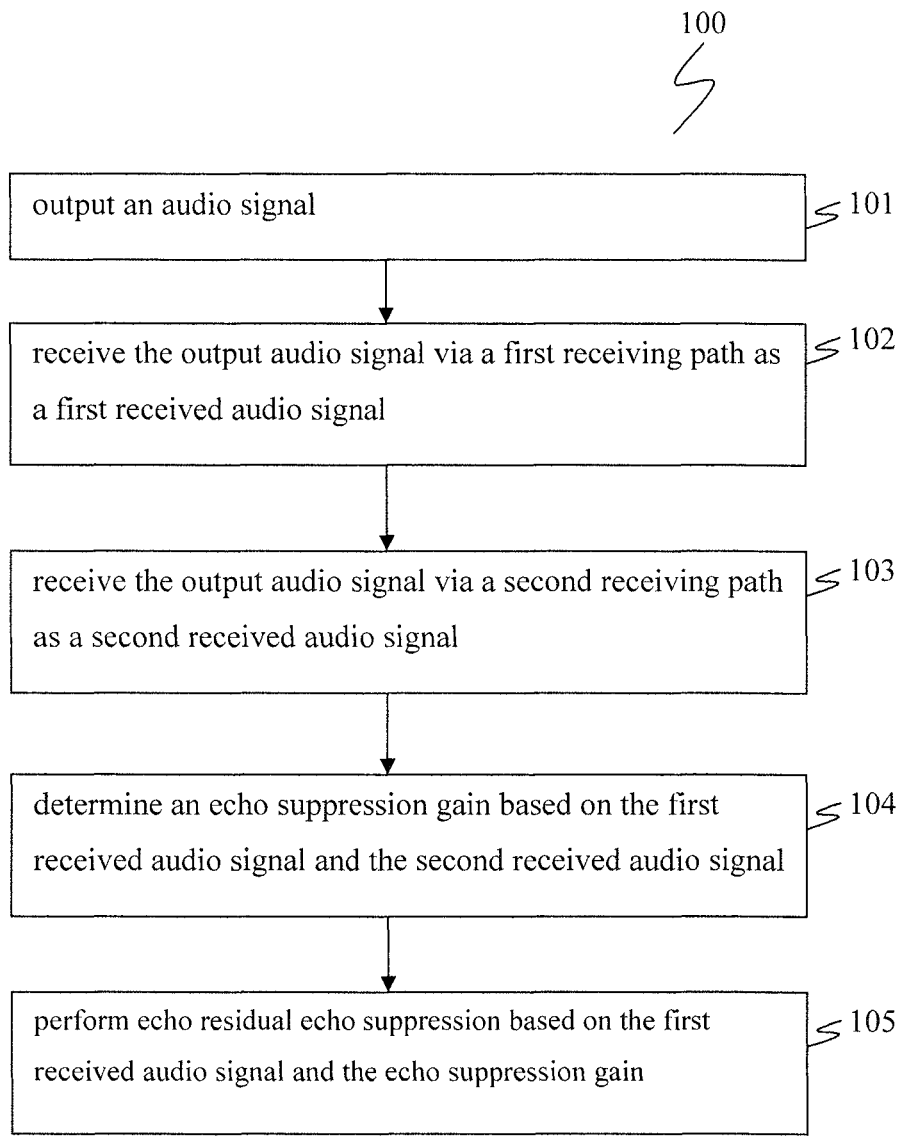
FIG. 1 shows a flow diagram illustrating a method for processing audio signals.

Generally, a method for processing audio signals as illustrated in FIG. 1 may be provided.

FIG. 1 shows a flow diagram 100.

The flow diagram 100 illustrates a method for processing audio signals.

In 101, an audio signal is output. For example, an audio signal may be output via a loudspeaker.

In 102, the output audio signal is received via a first receiving path as a first received audio signal. For example, the audio signal may be received via a first microphone.

In 103, the output audio signal is received via a second receiving path as a second received audio signal. For example, the output audio signal may be received via a second microphone.

In 104, an echo suppression gain is determined based on the first received audio signal and the second received audio signal.

In 105, echo suppression of the audio signal is filtered based on the first received audio signal and the echo suppression gain.

In this context, the term "ignored" may refer to not being taken into consideration. The term "determined" may refer to calculated, or estimated, or measured, for example.

In other words, a method of processing audio signal, or more specifically, of performing echo cancellation and echo suppression may be provided. The method may include an output signal from a transducer for example, a loudspeaker producing a sound which then will be reflected back to the device and thereby produce echos which may be captured by microphones along with a desired signal to be input into separate paths for processing. The combined signal (which may be a combination of the desired signal, the output signal and noise) in one of the separated paths may be used to determine or obtain a value to be used on the combined signal in another path such that a resultant signal may be obtained. The resultant signal may have echos (from the output signal) being suppressed and may be similar to the desired signal.

Echo suppression gain being determined based on the first audio signal may include echo of the first audio signal being filtered to produce a first echo error signal, the echo suppression gain being determined based on the first echo error signal and echo suppression of the audio signal being filtered based on the first echo error signal.

The echo suppression gain may for example be determined based on an estimate of the residual echo power spectral density of the first received signal (e.g. at the first microphone) and an estimate of the signal-to-echo ratio of the first received signal.

Echo suppression gain being determined based on the second audio signal may include echo of the second audio signal being filtered to produce a second echo error signal and the echo suppression gain being determined based on the second echo error signal.

The residual echo power spectral density (PSD) of the first received signal and the signal-to-echo ratio of the first received signal are for example determined based on an estimation of a relative transfer function characterizing (e.g. in frequency domain) the dependency of the second echo error signal from the audio signal that has been output in relation to the dependency of the first echo error signal from the audio signal that has been output.

The residual echo power spectral density of the first received signal and the signal-to-echo ratio of the first received signal may for example further be determined based on an estimation of a relative transfer function characterizing (e.g. in frequency domain) the dependency of the second echo error signal from a speech signal to the dependency of the first echo error signal from the speech signal.

The filtering of echo may include an adaptive echo filtering. For example, the first echo error signal is determined by subtracting a first estimate of the echo present in the first received audio signal from the first received audio signal. Similarly, the second echo error signal is for example determined by subtracting a second estimate of the echo present in the second received audio signal from the second received audio signal.

Filtering of the echo suppression of the audio signal may include ignoring the second received audio signal.

Outputting an audio signal may include outputting an audio signal via a loudspeaker.

Receiving the audio signal via a first receiving path as a first audio signal for example includes receiving the audio signal via a first microphone and receiving the output audio signal via a second receiving path as a second received audio signal for example includes receiving the output audio signal via a second microphone.

The method may further include a residual echo power being determined based on the first received audio signal and the second received audio signal. The echo suppression gain may be determined based on the residual echo power.

The multichannel audio signal information for example includes multichannel echo filtering information of the received audio signals.

The filtering of echo for example includes an adaptive echo filtering.

Outputting an audio signal may include outputting an audio signal via a loudspeaker.

The received audio signals are for example received via at least a first microphone and a second microphone.

The method as shown in the flow diagram 100 of FIG. 1 may further include at least one of the audio signal and the audio signal after echo suppression being beamformed.

In this context, the term "beamformed" or "beamforming" may generally refer to a signal processing technique used for directional signal transmission or reception.

Figure 2:
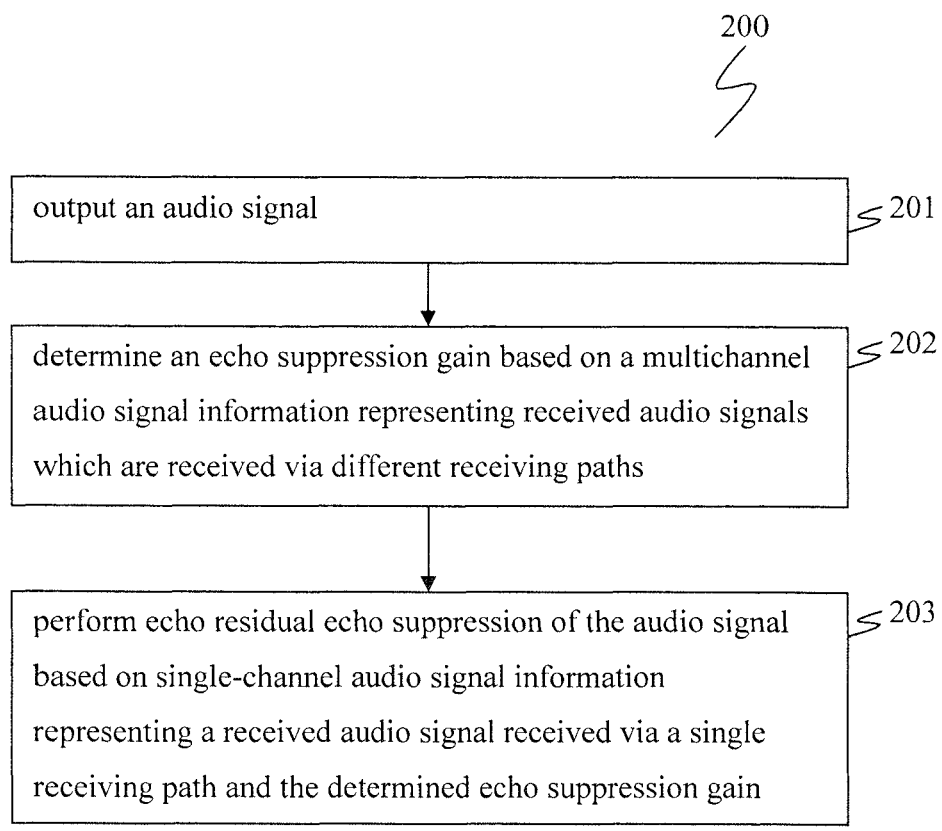
FIG. 2 shows a flow diagram illustrating a method for processing audio signals.

FIG. 2 shows a flow diagram 200.

The flow diagram 200 illustrates a method for processing audio signals.

In 201, an audio signal may be output. For example, an audio signal may be output via a loudspeaker.

In 202, an echo suppression gain may be determined based on a multichannel audio signal information representing received audio signals which are received via different receiving paths. For example, the received audio signals may be received via at least a first microphone and a second microphone.

In 203, echo suppression of the audio signal may be filtered based on single-channel audio signal information representing a received audio signal received via a single receiving path and the determined echo suppression gain. The determined echo suppression may be determined based on the multi-channel audio signal information.

The multichannel audio signal information may include echo filtering information of the received audio signals or multichannel echo filtering information of the received audio signals. The filtering of echo may include an adaptive echo filtering.

The method as shown in the flow diagram 200 of FIG. 2 may further include at least one of the audio signal and the audio signal after echo suppression being beamformed.

Figure 3:
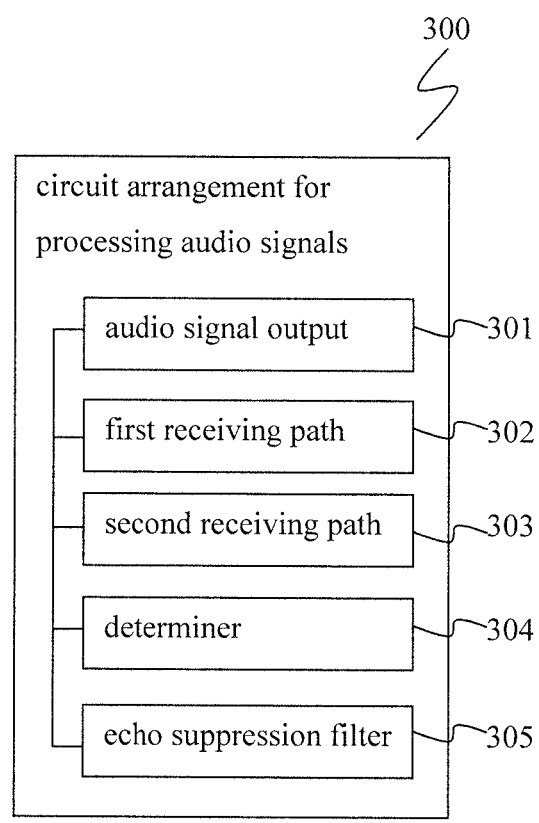
FIG. 3 shows a circuit arrangement for processing audio signals.

Generally a circuit arrangement for processing audio signals as illustrated in FIG. 3 may be provided.

FIG. 3 shows a circuit arrangement 300 for processing audio signals.

The circuit arrangement for processing audio signals 300 includes an audio signal output 301 for outputting an audio signal; a first receiving path 302 configured to receive the output audio signal 301 as a first received audio signal; a second receiving path 303 configured to receive the output audio signal 301 as a second received audio signal; a determiner 304 configured to determine an echo suppression gain based on the first received audio signal and the second received audio signal; and an echo suppression filter 305 coupled to the first receiving path 302 and the determiner 304 configured to filter echo suppression of the audio signal based on the first received audio signal and the echo suppression gain.

For example, the echo suppression filter 305 may be configured to ignore the second received audio signal when filtering the audio signal based on the first echo error signal. The term "ignore" and "determine" may similarly be defined as above for the term "ignored" and "determined", respectively.

The circuit arrangement 300 for example carries out a method as illustrated in FIG. 1.

The circuit arrangement for processing audio signals 300 may further include at least one echo filter, e.g. at least one adaptive echo filter, configured to filter the first received audio signal to produce a first echo error signal. The determiner 304 may be configured to determine the echo suppression gain based on the first echo error signal and the echo suppression filter 305 may be configured to filter echo suppression of the audio signal based on the first echo error signal.

The circuit arrangement 300 may further include at least one echo filter configured to filter the second audio signal to produce a second echo error signal. The determiner 304 may be configured to determine the echo suppression gain based on the second echo error signal.

For example, the at least one echo filter may include an adaptive echo filter.

The circuit arrangement 300 may further include a loudspeaker connected to the audio signal output 301.

The circuit arrangement 300 may further include a first microphone connected to the first receiving path 302 and a second microphone connected to the second receiving path 303.

The circuit arrangement 300 may further include a second determiner configured to determine a residual echo based on the first received audio signal and the second received audio signal. The second determiner may be configured to determine a second echo suppression gain based on the second received audio signal. The second determiner may use the first received audio signal and the second received audio signal to determine the second echo suppression gain. The two determiners may use audio signals received via different microphones. Furthermore, the output of the determiner and the second determiner may be applied to a beamforming circuit.

The circuit arrangement 300 may further include a beamformer configured to beamform the audio signals and/or the echo suppression filtered audio signals. For example, the beamformer may be used to beamform all multichannel received signals.

Figure 4:
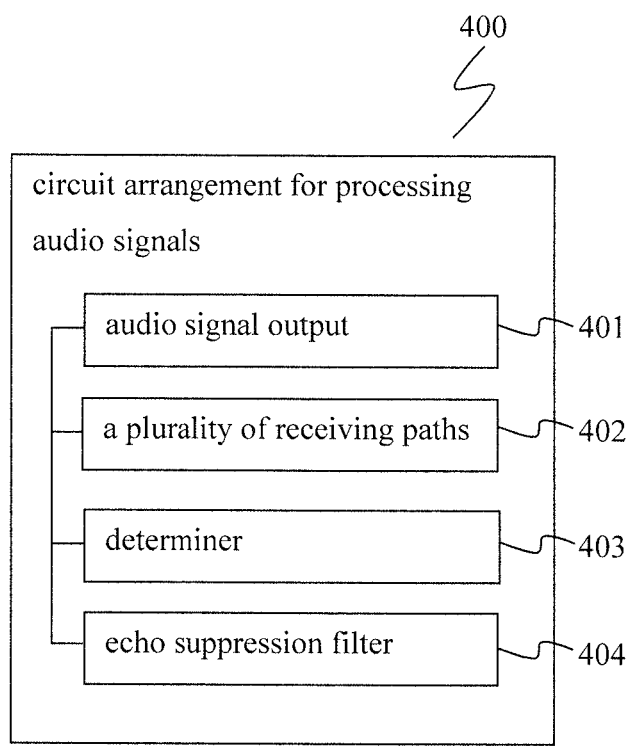
FIG. 4 shows a circuit arrangement for processing audio signals.

FIG. 4 shows a circuit arrangement for processing audio signals 400.

The circuit arrangement 400 for processing audio signals may include an audio signal output 401 for outputting an audio signal; a plurality of receiving paths 402 coupled to the audio signal output 401; a determiner 403 coupled to the plurality of receiving paths 402 and configured to determine an echo suppression gain based on a multichannel audio signal information representing a plurality of received audio signals received via the receiving paths 402; and an echo suppression filter 404 coupled to at least one of the plurality of receiving paths 402 and the determiner 403 and configured to filter the audio signal based on a single-channel audio signal information representing a received audio signal received via a single receiving path and the echo suppression gain.

The circuit arrangement 400 for example carries out a method as illustrated in FIG. 2.

For example, the multichannel audio signal information may include echo filtering information of the plurality of audio signals or multichannel echo filtering information of the plurality of audio signals.

The echo filter may include an adaptive echo filter.

The circuit arrangement 400 may further include a loudspeaker connected to the audio signal output 401.

The circuit arrangement 400 may further include a first microphone connected to one receiving path of the plurality of receiving paths 402; and a second microphone connected to another receiving path of the plurality of receiving paths 402.

The circuit arrangement 400 may further include a beamformer configured to beamform the audio signal and/or the echo suppression filtered audio signal.

It should be noted that aspects and features described in context of the method illustrated in FIG. 1 are analogously valid for the method illustrated in FIG. 3 and circuits shown in FIGS. 2 and 4 and vice versa.

Computation rules for the echo and gain may be provided. Also a software implementation or a hybrid implementation (partially in hardware and partially in software) of the determination of the echo and the gain may be provided.

Examples for the method illustrated by the flow diagram 100 and the circuit arrangement 300 are described in the following in more detail.

An exemplary system experiencing dual channel echo is described in the following.

Figure 5:
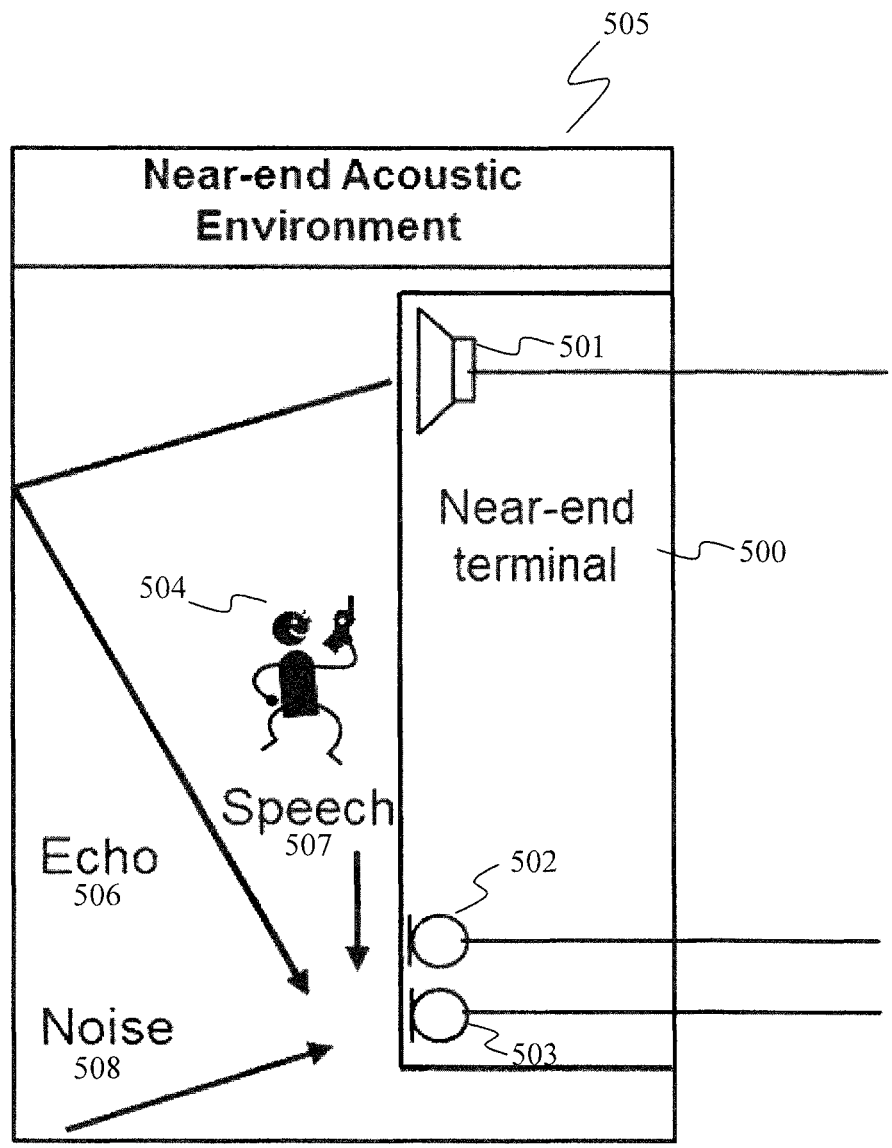
FIG. 5 shows an exemplary system experiencing a dual channel echo.

FIG. 5 shows a schematic representation of the system.

An example of a terminal 500 equipped with one loudspeaker 501 and two microphones 502, 503 is illustrated in FIG. 5. One of the microphone observations may be considered as the primary observation and the other as secondary observation. As shown in FIG. 5, the far-end speaker voice is played by the loudspeaker 501 to the near-end speaker 504. Part of this loudspeaker signal may reflect in the near-end environment 505 and may be later on picked up by both microphones 502, 503 as an echo 506. The coupling between the loudspeaker 501 and each microphone may define one acoustic path: two acoustic paths for the two microphones 502, 503.

The microphones 502, 503 may record the near-end speaker voice or speech signal 506 and eventually the background noise 508. The near-end speaker voice 507 may also reflect in the environment 505 before being picked up by the microphones 502, 503. Because both microphones 502, 503 may not necessarily be placed at the same position, the acoustic path between the near-end speaker and each microphone may have to be modeled. It should be appreciated that FIG. 5 does not present a limiting example of the microphones' positions and the microphones 502, 503 may be put differently on the terminal 500.

As an example, the microphones 502, 503 may be placed at corner regions of the terminal 500. The loudspeaker 501 may be placed slightly closer to the one microphone 502 as compared to the other microphone 503. As such, it may be considered that the microphone 502 provides a secondary microphone signal (or observation) and the other microphone 503 provides a primary microphone signal (or observation).

In some examples, the terminal 500 may be a telecommunication terminal that is equipped with one loudspeaker and two or more microphones.

It should also be appreciated that the terminal 500 may not be limited to only a telecommunication terminal and that the terminal 500 may be extended to a laptop or a tablet, which may also experience echo suppression. The terminal 500 may also be a handsfree mobile terminal.

Figure 6:
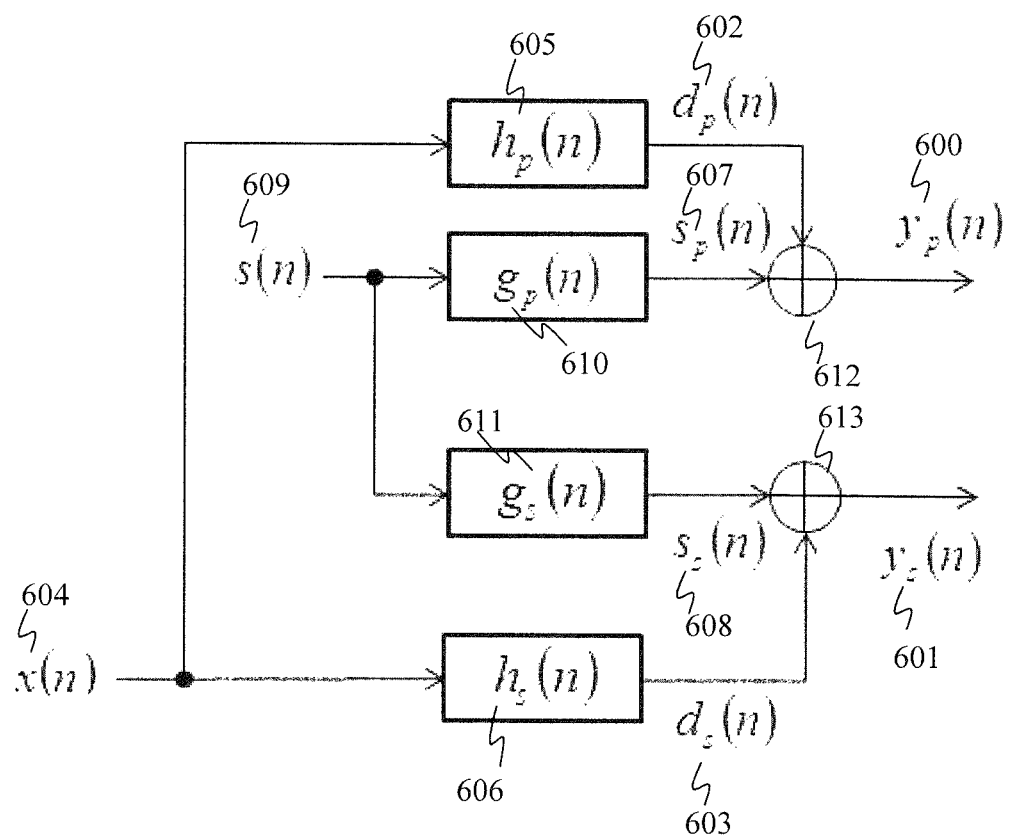
FIG. 6 shows a signal model matching the physical interactions between the acoustic sources and the transducers of the system.

The signal model of the dual channel (DC) echo problem is schematized as shown in FIG. 6.

FIG. 6 shows a schematic representation of a signal model matching the physical interactions between the acoustic sources and the transducers of the system as described in FIG. 5, illustrating how the primary and secondary microphone signals are determined.

The primary and secondary microphone signals 600, 601 are provided by the microphones 502, 503 and are denoted $y_p(n)$ and $y_s(n)$ respectively. The signals $d_p(n)$ 602 and $d_s(n)$ 603 represent the echo signal picked up by the primary and secondary microphone 502, 503 respectively. Both are generated by the loudspeaker signal $x(n)$ 604 of the loudspeaker 501 where $h_{p|s}(n)$ are represented by convolutive blocks 605, 606 accounting for the acoustic path between the loudspeaker 501 and respective microphones 502, 503.

The signals $s_p(n)$ 607 and $s_s(n)$ 608 represent the near-end speech signal picked up by the primary and secondary microphone 502, 503 respectively. Both are generated by the near-end speech signal $s(n)$ 609 (or 507), where $g_{p|s}(n)$ are represented by convolutive blocks 610, 611 accounting for the acoustic path between the near-end speaker 504 and the primary or secondary microphone 502, 503.

The primary microphone signal $y_p(n)$ 600 is given by the sum, provided by summing block 612, of $s_p(n)$ 607 and $d_p(n)$ 602. The secondary microphone signal $y_s(n)$ 601 is given by the sum, provided by summing block 613, of $s_s(n)$ 608 and $d_s(n)$ 603.

In respect with signal model in FIG. 6, the following equations may be derived:

$$y_p(n)=g_p(n)*s(n)+h_p(n)*x(n) \qquad \text{Eq. (1)}$$

$$y_s(n)=g_s(n)*s(n)+h_s(n)*x(n) \qquad \text{Eq. (2)}$$

where:
 $x(n)$ is the loudspeaker signal 604,
 $y_{p|s}(n)$ represents the primary or secondary microphone signals 600, 601 respectively,
 $h_{p|s}(n)$ 605, 606 represents the acoustic path between the loudspeaker 501 and the primary or secondary microphone 502, 503
 $s(n)$ 609 is the near-end speaker signal
 $g_{p|s}(n)$ 610, 611 represents the acoustic path between the near-end speaker 504 and the primary or secondary microphone 502, 503
 * represents the convolution operation.

In order to validate the signal model of FIG. 6, measurements of impulse responses may be performed with a mock-up phone in different acoustic environments. An artificial head (HEAD Acoustics HMS II.3) with mouth simulator may be used to simulate a near-end speaker. Two different positions for the phone may be used: one where the phone may be placed at about 30 cm straight in front of the artificial head's mouth and another where the phone may be placed on a table. Recordings may be made with the phone being placed such that the two microphones of the phone may be at equal distance of the artificial mouth. It is to be noted that the above may be applied to different acoustic environment (office, cabin, street, etc. . . .) and to any other communication device, e.g. in a handsfree mode as well as in a handset mode.

Figure 7A:
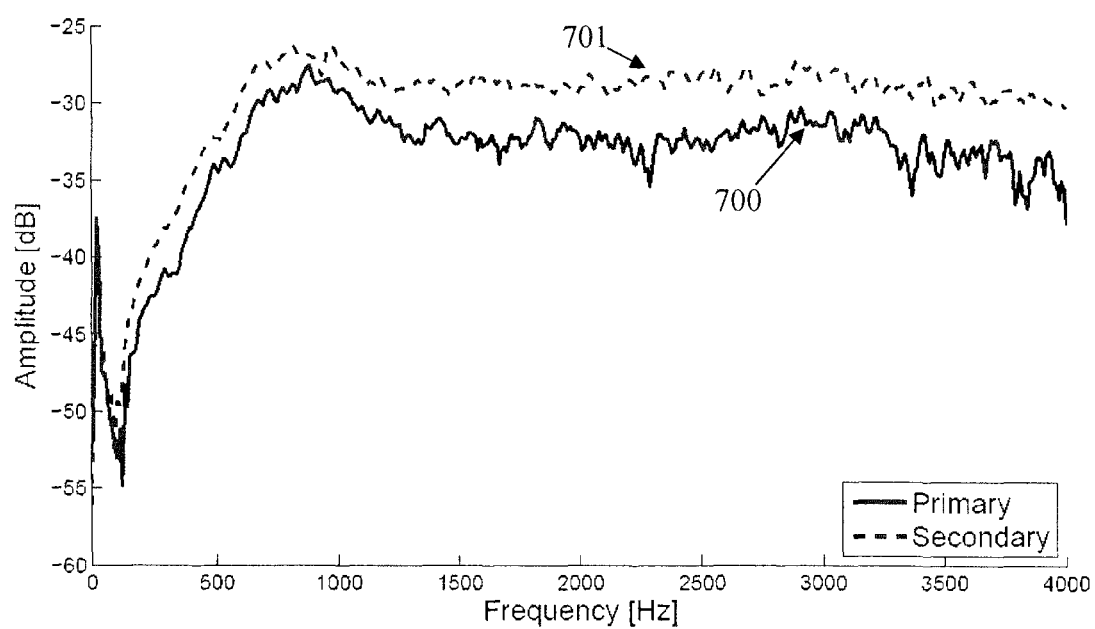
FIG. 7(a) shows an example of frequency response of the acoustic path between the loudspeaker and the microphones.

FIG. 7(a) shows an example of frequency responses of the acoustic paths between the loudspeaker and the microphones. FIG. 7(a) shows that the loudspeaker signal received by the microphones is not equally attenuated by the acoustic environment for each microphone. This may show the necessity to encounter for these differences by considering two acoustic echo paths (i.e. the acoustic echo path of the primary microphone 700 and the acoustic echo path of the secondary microphone 701) in the signal model of FIG. 6.

Figure 7B:
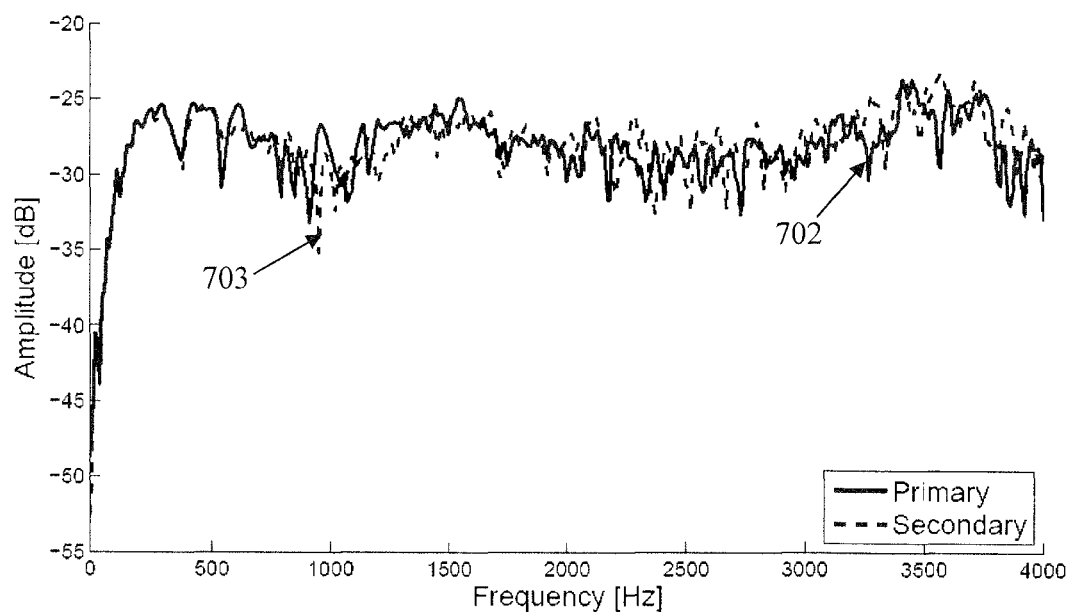
FIG. 7(b) shows an example of frequency response between the artificial head's mouth and the microphones.

FIG. 7(b) shows an example of frequency responses between the artificial head's mouth and the microphones. FIG. 7(b) shows that both impulse responses (i.e. the acoustic echo path of the primary microphone 702 and the acoustic echo path of the secondary microphone 703) are very similar. This similarities may be explained by the position of the microphones compared to the artificial head mouth. For this reason, it may be assumed that $g_p(n)=g_s(n)$. Although the previous assumption helps to reduce the computational complexity it is to be noted that this assumption is not necessary. Implementations may be done without this assumption.

Figure 8:
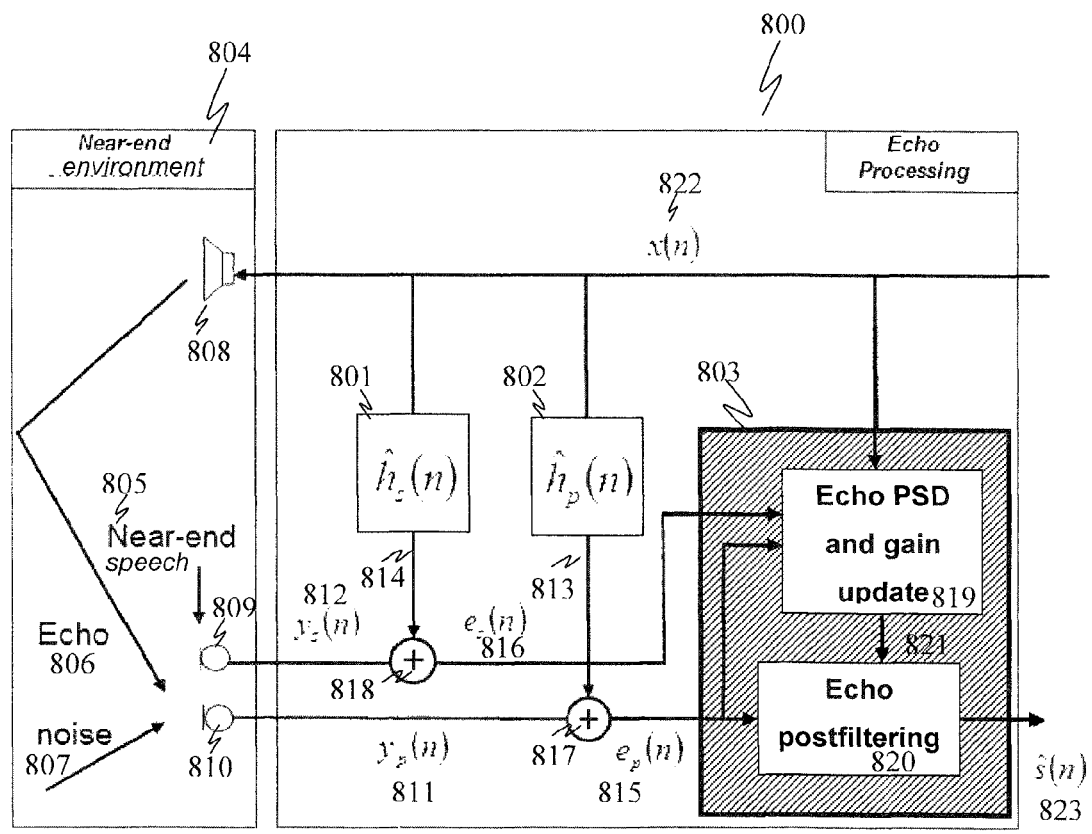
FIG. 8 shows a circuit for processing audio signals with echo cancellation.

For achieving single channel (SC) echo cancellation, an echo cancellation circuit 800 considered may include an adaptive filter part, which includes two adaptive filters 801, 802, followed by an echo postfilter 803 as shown in FIG. 8.

A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which are described may also be understood as a "circuit". For example, the various components of the circuit arrangement such as the determiner may be implemented by a circuit as described above.

FIG. 8 shows the circuit 800 for processing audio signals with echo cancellation. The circuit 800 may include a system 804 of acoustic sources (i.e. near-end speech 805, loudspeaker 808 signal giving rise to echo 806 and noise 807) and transducers (i.e. loudspeaker 808 and two microphones 809, 810). The system 804 may refer to the system 500 of FIG. 5 and may be represented by the signal model as illustrated in FIG. 6.

For each microphone 809, 810, the effect of echo may be considered to be the same as in a SC echo cancellation. Therefore for each microphone signal $y_{p|s}(n)$ 811, 812, an estimate of the echo signal 813, 814 may be obtained by the use of an adaptive filter 801, 802 as in the SC case.

Although in general, any adaptive echo cancellation process may be applied, e.g. any as such known adaptive echo cancellation algorithm, the standard NLMS algorithm may be used to estimate the echo signals.

For the same reasons that in the SC case, some residual echo may be present in the error signals $e_{p|s}(n)$ 815, 816 at the output of the acoustic echo cancellations (AECs). The error signal $e_{p|s}(n)$ 815, 816 may be obtained by the difference, provided by respective summing blocks 817, 818, between the microphone signals $y_{p|s}(n)$ 811, 812 and the respective estimates of the echo signals 813, 814. The postfilter 803 may be used to achieve further echo suppression. The postfilter 803 may include a filter update block 819 and an echo postfiltering block 820. The filter update block 819 produces an output 821 based on $e_{p|s}(n)$ 815, 816 and the loudspeaker signal x(n) 822 of the loudspeaker 808. For example in FIG. 8, this output 821 and $e_p(n)$ 815 are input into the echo postfiltering block 820 to give an echo suppressed signal ŝ(n) 823.

The circuit 800 may refer to the circuit arrangement 300 of FIG. 3. The loudspeaker signal x(n) 822 of the loudspeaker 808 may refer to the audio signal output 301; $y_p(n)$ 811 may refer to the first receiving path 302; $y_s(n)$ 812 may refer to the second receiving path 303; the filter update block 819 may refer to the determiner 304; and the echo postfiltering block 820 may refer to the echo suppression filter 305.

In a similar manner, the circuit 800 may refer to the circuit arrangement 400 of FIG. 4. The loudspeaker signal x(n) 822 of the loudspeaker 808 may refer to the audio signal output 401; $y_{p|s}(n)$ 811, 812 may refer to the plurality of receiving paths 402; the filter update block 819 may refer to the determiner 403; and the echo postfiltering block 820 may refer to the echo suppression filter 404.

Figure 9:
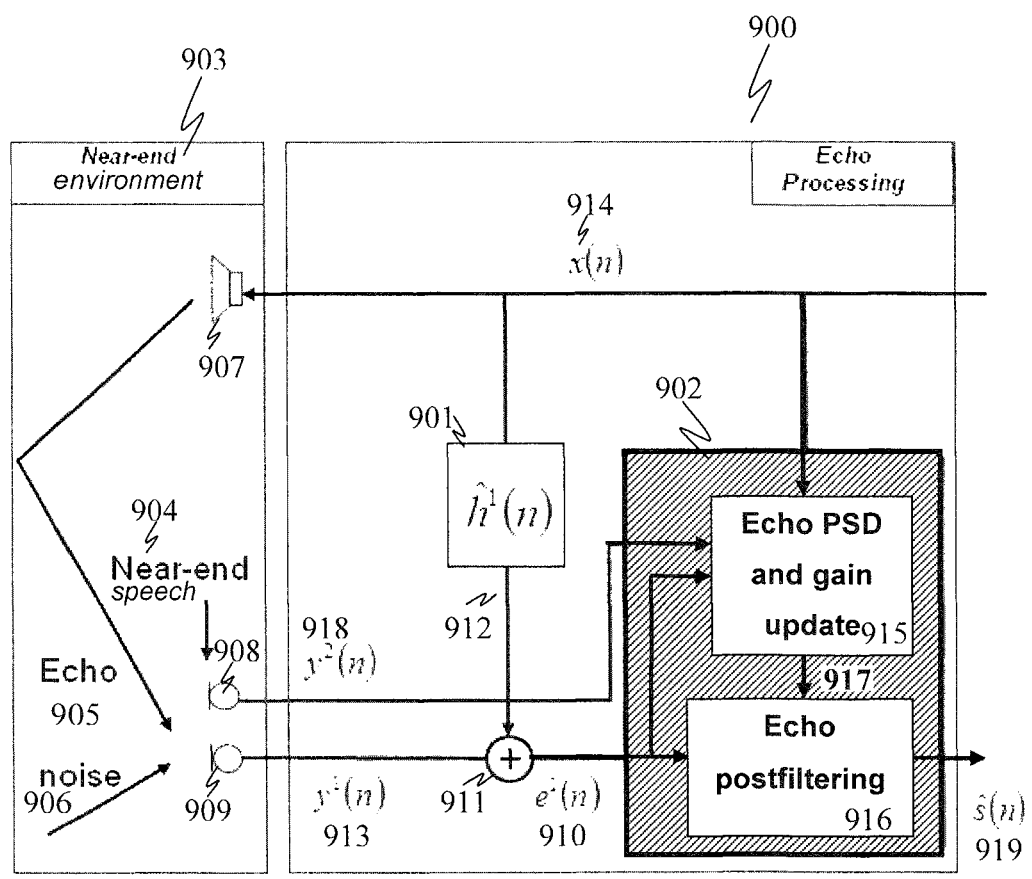
FIG. 9 shows a circuit for processing audio signals with echo cancellation using one adaptive filter.

FIG. 9 shows an echo cancellation circuit 900 including an adaptive filter part, which includes one adaptive filter 901, followed by an echo postfilter 902.

FIG. 9 shows the circuit 900 for processing audio signals with echo cancellation using only one adaptive echo filter.

The circuit 900 may include a system 903 of acoustic sources (i.e. near-end speech 904, loudspeaker 907 signal and noise 906) and transducers (i.e. loudspeaker 907 and two microphones 908, 909). The system 903 may refer to the system 500 of FIG. 5 and may be represented by the signal model as illustrated in FIG. 6.

In FIG. 9, the error signal $e^1(n)$ 910 may be obtained by the difference, provided by a summing block 911, between the primary microphone signal $y^1(n)$ 913 and an estimate of the echo signal 912. The estimate of the echo signal 912 may be obtained by having the loudspeaker signal x(n) 914 going through the adaptive filter 901. The postfilter 902 may be used to achieve further echo suppression. The postfilter 902 may include an echo power spectral density PSD and gain update block 915 and an echo postfiltering block 916. The echo PSD and gain update block 915 produces an output 917 based on $e^1(n)$ 910, the secondary microphone signal $y^2(n)$ 918 and the loudspeaker signal x(n) 914 of the loudspeaker 907. For example in FIG. 9, this output 917 and $e^1(n)$ 910 are input into the echo postfiltering block 916 to give an echo suppressed signal ŝ(n) 919, which may also be understood as an estimate of the near-end speech signal s(n) 904. It is to be noted that the echo power spectral density PSD and gain update block 915 may be equal to filter update block 819 as shown in FIG. 8.

The circuit 900 may refer to the circuit arrangement 300 of FIG. 3. The loudspeaker signal x(n) 914 of the loudspeaker 907 may refer to the audio signal output 301; $y^1(n)$ 913 may refer to the first receiving path 302; $y^2(n)$ 918 may refer to the second receiving path 303; the echo PSD and gain update block 915 may refer to the determiner 304; and the echo postfiltering block 916 may refer to the echo suppression filter 305.

In a similar manner, the circuit 900 may refer to the circuit arrangement 400 of FIG. 4. The loudspeaker signal x(n) 914 of the loudspeaker 907 may refer to the audio signal output 401; $y^{1|2}(n)$ 913, 918 may refer to the plurality of receiving paths 402; the echo PSD and gain update block 915 may refer to the determiner 403; and the echo postfiltering block 916 may refer to the echo suppression filter 404.

Generally, the circuit 900 may function in a similar manner as the circuit 800 of FIG. 8 with the except that only one adaptive filter 901 is used in the circuit 900. Using only one adaptive filter 901 may reduce the computational complexity of the multi-channel echo postfilter. The use of one adaptive filter 901 may also be advantageous as the computation of the spectral gains may benefit from the high correlation between the loudspeaker signal x(n) 914 and the other microphone signals ($y^2(n)$ 918 for the example of FIG. 9) although the echo suppression itself is applied on a signal with reduced echo($e^1(n)$ 910 for the example of FIG. 9).

The circuits 800, 900 may be extended to multi-channel m. In multi-channels including a plurality of receiving paths, for example the plurality of receiving paths 402 of FIG. 4, x(n) is the loudspeaker signal, $y^m(n)$ represents the $m^{th}$ microphone signal with m ranging from 1 to M, the number of microphones of the terminal. Each microphone signal contains echo $d^m(n)$ and near-end speech signal $s^m(n)$, $h^m(n)$ is the acoustic path between the loudspeaker and the $m^{th}$ microphone such that $d^m(n)=h^m(n)*x(n)$, $\hat{h}^m(n)$ is the estimate of $h^m(n)$, $e^m(n)=y^m(n)-\hat{d}^m(n)$ is the error signal from the adaptive filtering for the $m^{th}$ microphone signal. When only one adaptive filter is used as in FIG. 9, $e^m(n)=y^m(n)$ for m≥2. $g^m(n)$ is the acoustic path between the near-end speaker and the $m^{th}$ microphone such that $s^m(n)=g^m(n)*s(n)$, ŝ(n) is the output of the postfilter, that is an estimate of the near-end speech s(n).

For example, the echo suppression may still be applied only to the primary microphone path. This means existing SC echo suppression gain rules may still be used. The computation of a gain rule may generally require estimates of the residual echo PSD and of the near-end PSD. For example, the following gain rules may be used:

$$W_1(k, i) = \frac{\Phi^{S_p S_p}(k, i)}{\Phi^{S_p S_p}(k, i) + \Phi^{\tilde{D}_p \tilde{D}_p}(k, i)} \qquad \text{Eq. (3)}$$

$$W_2(k, i) = \frac{SER(k, i)}{1 + SER(k, i)} \qquad \text{Eq. (4)}$$

where $\Phi^{S_p S_p}(k,i)$ is the PSD of the near-end speech, $\Phi^{\tilde{D}_p \tilde{D}_p}(k,i)$ is the PSD of the residual echo at the primary microphone and $SER(k,i) = \Phi^{S_p S_p}(k,i)/\Phi^{\tilde{D}_p \tilde{D}_p}(k,i)$ is the signal-to-echo ratio (SER) at the primary microphone. However, it is to be noted that any kind of gain rule may be used that uses or requires an estimate of the near-end speech PSD and/or of the residual echo PSD.

It should be appreciated and understood that computing subband echo postfilter requires the estimation of the residual echo PSD and/or the near-end speech signal PSD. A method to estimate the residual echo and near-end speech PSDs in DC or multichannel case echo postfiltering problem may be introduced.

New estimations of residual echo and near-end PSDs are described below. For dual channel or multichannel echo postfiltering the computation of these PSDs requires the knowledge of relative transfer functions (RTF).

A residual echo and near-end PSD estimate may be provided.

The difference for the computation of the residual echo and near-end PSDs lies in the use of at least two microphone signals instead of one. In the following example, the estimation of these PSDs for the dual channel case is discussed.

Signals equations at the postfilter in the case of two adaptive filters:

(a) Error signals equations in the time domain $$\begin{aligned} e_p(n) &= y_p(n) - \hat{d}_p(n) \\ &= y_p(n) - \hat{h}_p(n) * x(n) \\ &= g_p(n) * s(n) + \tilde{d}_p(n) \\ &= g_p(n) * s(n) + \tilde{h}_p(n) * x(n) \end{aligned} \qquad \text{Eq. (4)}$$

$$\begin{aligned} e_s(n) &= y_s(n) - \hat{d}_s(n) \\ &= y_s(n) - \hat{h}_s(n) * x(n) \\ &= g_s(n) * s(n) + \tilde{d}_s(n) \\ &= g_s(n) * s(n) + \tilde{h}_s(n) * x(n) \end{aligned} \qquad \text{Eq. (5)}$$

where $\tilde{h}_{p|s}(n) = h_{p|s}(n) - \hat{h}_{p|s}(n)$ represents the echo path misalignment vector.

(b) Error signals in the frequency domain $$E_p(k,i) = G_p(k,i) \cdot S(k,i) + \tilde{H}_p(k,i) \cdot X(k,i) \qquad \text{Eq. (6)}$$

$$E_s(k,i) = G_s(k,i) \cdot S(k,i) + \tilde{H}_s(k,i) \cdot X(k,i) \qquad \text{Eq. (7)}$$

where:
$E_p(k,i)$ and $E_s(k,i)$ are Fourier transform of the error signals of the primary and secondary microphone, respectively k and i respectively represent the frame and frequency bin indexes In the following, the frame and frequency indexes will be omitted for clarity purposes and will only be used when necessary.

(c) Residual echo signals auto- and cross-psds

Assuming loudspeaker signal and the near-end speech signal are uncorrelated (i.e. their cross-PSD is null $\Phi^{XS}=0$), the following may be written:

$$\Phi^{E_p E_p} = |G_p|^2 \cdot \Phi^{SS} + |\tilde{H}_p|^2 \cdot \Phi^{XX} \qquad \text{Eq. (8)}$$

$$\Phi^{E_s E_s} = |G_s|^2 \cdot \Phi^{SS} + |\tilde{H}_s|^2 \cdot \Phi^{XX} \qquad \text{(n Eq. 9)}$$

$$\Phi^{E_p E_s} = G_p \cdot G_s^* \cdot \Phi^{SS} + \tilde{H}_p \cdot \tilde{H}_s^* \cdot \Phi^{XX} \qquad \text{Eq. (10)}$$

where:
$\Phi^{E_p E_p}$ and $\Phi^{E_s E_s}$ represent the auto-PSD and $\Phi^{E_p E_s}$ is the cross-PSD of the error signals
$\Phi^{SS}$ and $\Phi^{XX}$ respectively represent the near-end speech signal and the loudspeaker auto-PSDs.

Two RTFs $\Gamma$ and $\Theta$ may be defined as follow:

$$\Gamma = \frac{\tilde{H}_s}{\tilde{H}_p}, \Theta = \frac{G_s}{G_p}. \qquad \text{Eq. (11)}$$

Rewriting Eqs. (8) to (10) with the above notations, the following may be obtained:

$$\Phi^{E_p E_p} = |G_p|^2 \cdot \Phi^{SS} + |\tilde{H}_p|^2 \cdot \Phi^{XX} \qquad \text{Eq. (12)}$$

$$\Phi^{E_s E_s} = |\Theta \cdot G_p|^2 \cdot \Phi^{SS} + |\Gamma \cdot \tilde{H}_p|^2 \cdot \Phi^{XX} \qquad \text{Eq. (13)}$$

$$\Phi^{E_p E_s} = \Theta^* \cdot |G_p|^2 \cdot \Phi^{SS} + \Gamma^* |\tilde{H}_p|^2 \cdot \Phi^{XX} \qquad \text{Eq. (14)}$$

From Eqs. (12) to (14), new estimates of the residual echo and near-end PSDs may be deduced as follow:

$$\Phi^{\tilde{D}_p \tilde{D}_p} = \frac{|\Theta|^2 \cdot \Phi^{E_p E_p} - \Phi^{E_s E_s}}{|\Theta|^2 - |\Gamma|^2} \qquad \text{Eq. (15)}$$

$$\Phi^{S_p S_p} = \frac{\Phi^{E_s E_s} - |\Gamma|^2 \cdot \Phi^{E_p E_p}}{|\Theta|^2 - |\Gamma|^2} \qquad \text{Eq. (16)}$$

Another set of PSDs estimate may be derived by taking into account the error signals cross-PSD $\Phi^{E_p E_s}$:

$$\Phi^{\tilde{D}_p \tilde{D}_p} = \frac{|\Theta|^2 \cdot \Phi^{E_p E_p} + \Phi^{E_s E_s} - 2 \cdot \text{Re}\{\Theta \cdot \Phi^{E_p E_s}\}}{|\Theta - \Gamma|^2} \qquad \text{Eq. (17)}$$

$$\Phi^{S_p S_p} = \frac{|\Gamma|^2 \cdot \Phi^{E_p E_p} + \Phi^{E_s E_s} - 2 \cdot \text{Re}\{\Gamma \cdot \Phi^{E_p E_s}\}}{|\Theta - \Gamma|^2} \qquad \text{Eq. (18)}$$

Two sets of PSDs estimates may be used to compute echo postfilter gains in case of DC echo processing. In either case (i.e. the set of Eqs. (15) and (16), or the set of Eqs. (17) and (18)), the computation of $\Phi^{\tilde{D}_p \tilde{D}_p}$ and $\Phi^{S_p S_p}$ requires the knowledge of the RTFs $\Gamma$ and $\Theta$ which are unknown in a real time system and therefore need to be estimated. It should be understood and appreciated that the set of Eqs. (17) and (18) requires the modulus and phase of the different RTFs while the set of Eqs. (15) and (16) only requires the modulus of the different RTFs. Phase modification in speech processing should be handled with care as it may easily introduce distortion. For this reason, the use of the set of Eqs. (15) and (16) for DC echo postfiltering may be altogether avoided.

The RTFs may need to be estimated. Methods to estimate RTF may include cross-spectral method, mean square or least square error minimization.

(a) Near-end speech acoustic paths RTF estimation

The near-end speech acoustic paths $\Theta$ is defined as:

$$\Theta = \frac{G_s}{G_p}. \qquad \text{Eq. (19)}$$

$\Theta$ may also be interpreted as a gain such that:

$$S_s = \Theta \cdot S_p \qquad \text{Eq. (20)}$$

Considering near-end only speech activity period (i.e. $E_p = S_p = G_p \cdot S$ and $E_s = S_s = G_s \cdot S$), an estimate $\hat{\Theta}$ of $\Theta$ may be obtained through mean square error (MSE) or least square error (LSE) minimization.

The minimum MSE (MMSE) criteria used for the derivation of the MMSE estimate of $\hat{\Theta}$ is:

$$\hat{\Theta}_{MMSE} = \underset{\hat{\Theta}}{\operatorname{argmin}}\left(|S_s - \hat{S}_s|^2\right) \text{ with } \hat{S}_s = \hat{\Theta} \cdot S_p. \qquad \text{Eq. (21)}$$

The MMSE estimate of $\hat{\Theta}$ is then given by $$\hat{\Theta}_{MMSE} = \frac{\Phi^{S_p S_s}}{\Phi^{S_s S_s}} = \frac{\Phi^{E_p E_s}}{\Phi^{E_s E_s}}. \qquad \text{Eq. (22)}$$

Another estimate in the form of an adaptive filter may be derived from Eq (23) below. In this case, one has many choices for the adaptive filter, for example, LMS, NLMS or FBLMS. It should be understood that as the minimization criteria (Eq (23)) is in the frequency domain using LMS or NLMS may lead to an estimate in the frequency domain. The NLMS solution, which proves to be a relatively stable and robust, is as follow:

$$\hat{\Theta}_{NLMS}(k+1, i) = \hat{\Theta}_{NLMS}(k, i) + \mu \frac{E_p(k, i)}{\|E_p(k, i)\|^2} \tilde{e}(k, i) \qquad \text{Eq. (23)}$$

where:

$\tilde{e}(k,i) = E_s(k,i) - \hat{E}_s(k,i) = E_s(k,i) - \hat{\Theta}_{NLMS}(k,i) \cdot E_s(k,i)$ is the error signal $\mu$ is the stepsize which may be set to a fixed value for the simplicity purposes.

The LSE minimization may also be used to estimate the near-end RTF $\hat{\Theta}$. The LSE estimate of $\Theta$ expresses as follows:

$$\hat{\Theta}_{LSE} = \frac{\langle \Phi^{E_p E_p} \Phi^{E_p E_s} \rangle - \langle \Phi^{E_p E_p} \rangle \langle \Phi^{E_p E_s} \rangle}{\langle (\Phi^{E_p E_p})^2 \rangle - \langle \Phi^{E_p E_p} \rangle^2}. \qquad \text{Eq. (24)}$$

where $$\langle \beta \rangle = \langle \beta(k, i) \rangle = \frac{1}{K} \sum_{k=1}^{K} \beta(k, i) \qquad \text{Eq.}$$

given a set of K measures of $\beta$ along time.

Details about the derivation of $\hat{\Theta}_{LSE}$ are presented later on. In any of the cases ($\hat{\Theta}_{MMSE}$, $\hat{\Theta}_{NLMS}$ or $\hat{\Theta}_{LSE}$), the update may be performed during near-end only activity period.

An activity detection on the loudspeaker may be detected near-end only activity periods. For example, the activity detection may be achieved by applying a threshold on the loudspeaker and microphone signals energies. The threshold on the loudspeaker energy may avoid adaptation during far-end activity periods whereas the threshold on the microphone signals may avoid adaptation during near-end silence period or on low amplitude microphone signal.

(b) Echo paths RTF estimation $\Gamma$ is defined as the ratio between the primary and the secondary residual echo paths:

$$\Gamma = \frac{\tilde{H}_s}{\tilde{H}_p} \qquad \text{Eq. (25)}$$

Similarly to $\Theta$ in Eq. (19) and Eq. (20), $\Gamma$ defines the link between the residual echo of primary and secondary microphone in the following manner:

$$\tilde{D}_s = \Gamma \cdot \tilde{D}_p \qquad \text{Eq. (26)}$$

Introducing Eq. (26) in Eqs. (6) and (7) respectively, the following may be obtained:

$$E_p = G_p \cdot S + \tilde{H}_p \cdot X = S_p + \tilde{D}_p \qquad \text{Eq. (27)}$$

$$E_s = G_s \cdot S + \tilde{H}_s \cdot X = S_s + \Gamma \cdot \tilde{D}_s \qquad \text{Eq. (28)}$$

Using the fact that $\tilde{D}_s$ and $\tilde{D}_p$ are both generated by the loudspeaker signal x(n), $\Gamma$ may be estimated through the cross-correlation. Assuming independence of loudspeaker and near-end speech signals (i.e. $\Phi^{XS}=0$), the cross-correlation estimator of $\Gamma$ expresses as follows:

$$\hat{\Gamma}_{CC} = \frac{\Phi^{XE_s}}{\Phi^{XE_p}} \qquad \text{Eq. (29)}$$

where $\Phi^{XE_p}$ and $\Phi^{XE_s}$ are the cross-correlation between the loudspeaker and error signals on the primary and secondary microphone respectively and express as follows:

$$\Phi^{E_p X} = \tilde{H}_p \cdot \Phi^{XX}$$

$$\Phi^{E_s X} = \tilde{H}_s \cdot \Phi^{XX} \qquad \text{Eq. (30)}$$

The least square may also be used to derive an estimate of the echo RTF $\Gamma$. In this case the minimization criterion writes as follows:

$$\hat{\Gamma} = \underset{\hat{\Gamma}}{\operatorname{argmin}}\left(\sum |\tilde{D}_s - \hat{\tilde{D}}_s|\right)^2 \qquad \text{Eq. (31)}$$

The LS estimate of Γ expresses as follows:

$$\hat{\Gamma}_{LS} = \frac{\langle \Phi^{E_s X} \Phi^{E_p X} \rangle}{\langle (\Phi^{E_p X})^2 \rangle} \qquad \text{Eq. (32)}$$

The derivation of the LS estimate of Γ is presented below. It is noted that $\hat{\Gamma}_{LS}$ matches $\hat{\Gamma}_{CC}$ if only one frame is consider for the least square criterion minimization.

PSD estimates involving multi-microphones may be provided. A communication terminal equipped with one loudspeaker and M microphones may be considered. Each microphone records both the echo signal which is generated by the loudspeaker, and the near-end speech signal. The signal on the $m^{th}$ microphone signal may be written as follows:

$$y_m(n) = g_m(n) * s(n) + h_m(n) * x(n) \qquad \text{Eq. (33)}$$

where
 $y_m(n)$ is the signal picked up by the $m^{th}$ microphone signal
 $h_m(n)$ is the acoustic path between the loudspeaker and $m^{th}$ microphone signal
 $g_m(n)$ is the acoustic path between the near-end speaker and $m^{th}$ microphone signal.

Figure 10:
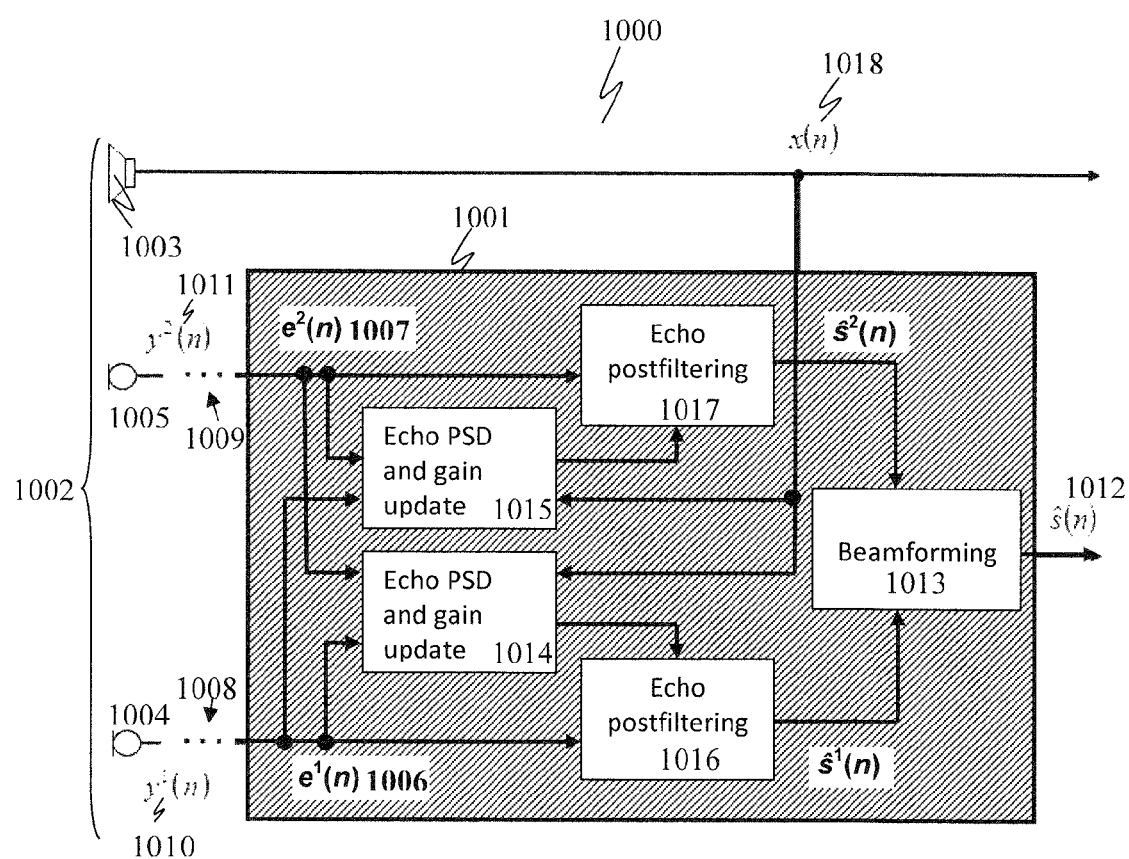
FIG. 10 shows a circuit including a device for echo postfiltering and a system having transducers.

As for the dual-channel case discussed above, an adaptive filter may be used to estimate the echo signal picked up by the $m^{th}$ microphone. Therefore, the multi-channel postfilter may take the loudspeaker signal and the microphone and/or error for microphone paths using an adaptive filter signals as inputs. Furthermore, the multi-channel information may only be used in the computation of the echo suppression while echo suppression itself may take place on the $m^{th}$ microphone path which has an adaptive filter FIG. 10 shows a circuit 1000 including a device 1001 for echo postfiltering and a system 1002 having transducers (i.e. a loudspeaker 1003 and multi-channel microphones, for example two microphones 1004, 1005), which are used to compute the echo PSD estimate 1006, 1007 of the $m^{th}$ microphone path. The dots 1008, 1009 on the respective microphones 1004, 1005 may account for the presence of adaptive filter (not shown in FIG. 10) which may possibly be used before the echo postfilter device 1001. The error signal 1006, 1007 may be used to compute the echo suppression gain that is applied on the $m^{th}$ microphone signal, for example $y^{1|2}(n)$ 1010, 1011, to obtain an estimate of the near-end speech received by the respective microphones 1004, 1005. An estimate of the near-end speech §(n) 1012 may be synthetized by a beamformer 1013.

The device 1001 may include for each receiving path, an echo PSD and gain update block 1014, 1015 and an echo postfiltering block 1016, 1017 prior to the beamformer 1013.

The loudspeaker signal x(n) 1018 of the loudspeaker 1003 may refer to the audio signal output 301; $y^1(n)$ 1010 may refer to the first receiving path 302; $y^2(n)$ 1011 may refer to the second receiving path 303; the echo PSD and gain update blocks 1014, 1015 may refer to the determiner 304; and the echo postfiltering blocks 1016, 1017 may refer to the echo suppression filter 305.

The loudspeaker signal x(n) 1018 of the loudspeaker 1003 may refer to the audio signal output 401; $y^{1|2}(n)$ 1010, 1011 may refer to the plurality of receiving paths 402; the echo PSD and gain update blocks 1014, 1015 may refer to the determiner 403; and the echo postfiltering blocks 1016, 1017 may refer to the echo suppression filter 404.

Figure 11:
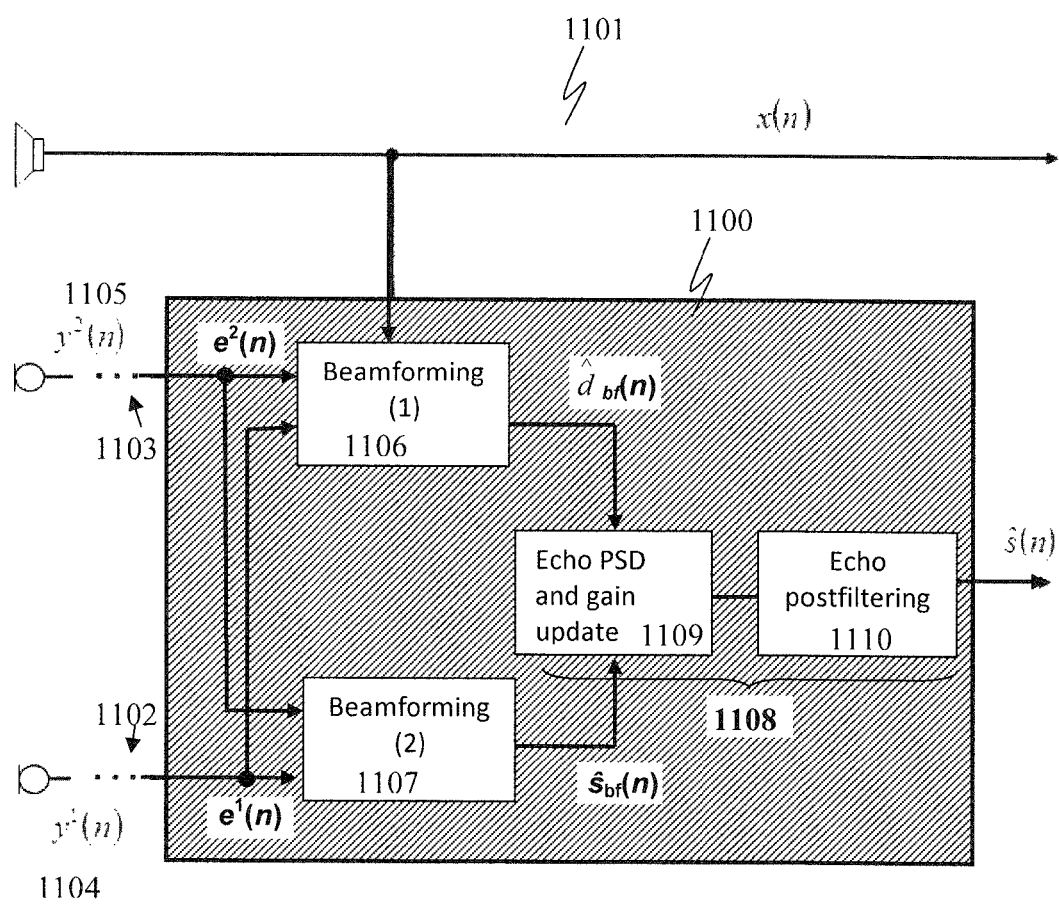
FIG. 11 shows a circuit including an alternative device for echo postfiltering and a system having transducers.

Another device 1100 for multi-channel echo postfiltering may be provided as illustrated in FIG. 11.

FIG. 11 shows a circuit 1101 including the device 1100. The circuit 1101 may be similarly referred to as in the circuit 1000 of FIG. 10.

The dots 1102, 1103 on the microphone path 1104, 1105 encounters for the presence of adaptive filter (not shown in FIG. 11) which may possibly be used before the echo postfilter device 1100.

As compared to the device 1001 of FIG. 10, the device 1100 of FIG. 11 may include the beamforming (1) 1106 which may be used to steer the inputs signals towards the direction of the echo signal. This means that the signal at the output of this block should be composed of echo only. However, as beamformers have limited performance, part of the near-end speech signal may be present at the output of beamforming (1) 1106. The beamforming (2) 1107 may have the same objective as the beamforming (1) 1106 except it steers the multi-channel signals towards the direction of the near-end signals. For the same reason as for the beamforming (1) 1106, some echo may be present at the output of the beamforming (2) 1107 block. A dual-channel postfilter 1108 may include an echo PSD and gain update block 1109 and an echo postfiltering block 1110. The dual-channel postfilter 1108 may be used to further reduce the echo present at the output of beamforming (2) 1107 block.

FIG. 11 can be seen to be based on the fact that any multichannel echo cancellation may reduce to a dual-channel echo suppression solution. When such scheme is used for a terminal with M microphones, then the M microphone signals are given as input to the two beamformers 1103, 1104 which are used to estimate the echo or the near-end signals. These beamforming outputs may then be used as input to the echo PSD and gain update block 1105.

For the scheme illustrated in FIGS. 10 and 11 and similarly to PSDs estimates derived for FIGS. 8 and 9 (which represent the dual microphone case), echo and near-end PSDs for the $m^{th}$ microphone path may be estimated as follows:

$$\Phi_i^{D_m D_m}(n) = \frac{\sum_{k=1,k\neq m}^{M}\left(|\Theta_i^{m,k}(n)|^2 - |\Gamma_i^{m,k}(n)|^2\right) \cdot \left(|\Theta_i^{m,k}(n)|^2 \cdot \Phi_i^{Z^m Z^m}(n) - \Phi_i^{Z^k Z^k}(n)\right)}{\sum_{k=1,k\neq m}^{M}\left(|\Theta_i^{m,k}(n)|^2 - |\Gamma_i^{m,k}(n)|^2\right)^2} \qquad \text{Eq. (34)}$$

$$\Phi_i^{S_m S_m}(n) = \frac{\sum_{k=1,k\neq m}^{M}\left(|\Theta_i^{m,k}(n)|^2 - |\Gamma_i^{m,k}(n)|^2\right) \cdot \left(\Phi_i^{Z^k Z^k}(n) - |\Gamma_i^{m,k}(n)|^2 \cdot \Phi_i^{Z^m Z^m}(n)\right)}{\sum_{k=1,k\neq m}^{M}\left(|\Theta_i^{m,k}(n)|^2 - |\Gamma_i^{m,k}(n)|^2\right)^2} \qquad \text{Eq. (35)}$$

where:
 $\Phi_i^{Z^m Z^m}(n)$ represents the auto-PSD of $z^m(n)$ which is either equal to $e^m(n)$ if an adaptive filter is used for the $m^{th}$ microphone or to $y_m(n)$ if no adaptive filter is used,
 $\Gamma_i^{m,k}(n)$ and $\Theta_i^{m,k}(n)$ are the (residual) echo and near-end speech relative transfer functions for the $k^{th}$ microphone when computing PSDs estimate for the $m^{th}$ microphone.
 $\Phi_i^{D_m D_m}(n)$ is the (residual) echo PSD on the $m^{th}$ microphone and is required for the computation of the echo suppression gain of the $m^{th}$ microphone $\Phi_i^{S_m S_m}(n)$ is near-end speech signal PSD on the $m^{th}$ microphone.

The relative transfer function may be defined as follow:

$$\Gamma_i^{m,k}(n) = \frac{\tilde{H}_i^m(n)}{\tilde{H}_i^k(n)} = \frac{H_i^m(n) - \hat{H}_i^m(n)}{H_i^k(n) - \hat{H}_i^k(n)} \text{ and} \quad \text{Eq. (36)}$$

$$\Theta_i^{m,k}(n) = \frac{G_i^m(n)}{G_i^k(n)}.$$

With $\hat{H}_i^m(n)$ equal to 0 in case no adaptive filter is used on the $m^{th}$ microphone path.

The function of postfilter may be expressed as follows:

$$W = \frac{\Phi^{S_m S_m}}{\Phi^{S_m S_m} + \Phi^{D_m D_m}} \quad \text{Eq. (37)}$$

$$W = \frac{SER}{1 + SER}. \quad \text{Eq. (38)}$$

The previous equations (Eqs. (37) and (38)) show that the computation of the postfilter requires an estimation of the echo PSD on the $m^{th}$ microphone $\Phi^{D_m D_m}$ and/or near-end PSD on the $m^{th}$ microphone $\Phi^{S_m S_m}$. However any kind of gain rule may be used that uses or requires an estimate of the near-end speech PSD and of the residual echo PSD.

In the derivation of the multi-channel PSDs estimate that follows, no adaptive filter is assumed for use on the microphone paths (it is to be noted that this assumption is not limiting and is only made for reasons of simplicity of the explanation). This implies that input microphone signals are $y_m(n)$. Given the microphone observation $y_m(n)$, its Fourier transform may be written as follows:

$$Y_m = G_m \cdot S + H_m \cdot X \quad \text{Eq. (39)}$$

In the example above, two different estimates for the residual echo and near-end PSDs for the dual-channel terminals are discussed as in Eqs. (17) and (18). Although the use of the estimates in Eqs. (17) and (18) involves phase information which is delicate to handle in speech processing, multi-channel echo and near-end PSD estimates that matches both formalism (the set of Eqs. (15) and (16) and the set of Eqs. (17) and (18)) are presented in the following.

PSD estimates match Eqs. (15) and (16) for M=2. Assuming loudspeaker signal and the near-end speech signal are uncorrelated (i.e. their cross-PSD is null $\Phi^{XS}=0$), the $l^{th}$ microphone auto-PSD expresses as follows:

$$\Phi^{Y_l Y_l} = \Phi^{S_l S_l} + \Phi^{D_l D_l} = |G_l|^2 \cdot \Phi^{SS} + |H_l|^2 \cdot \Phi^{XX} \quad \text{Eq. (40)}$$

where l is the microphone channel index ranging from 1 to M.

By introducing the RTF of Eq. (41)

$$\Gamma^{m,l} = \frac{H_l}{H_m}, \Theta^{m,l} = \frac{G_l}{G_m} \quad \text{Eq. (41)}$$

into Eq. (40), the following may be obtained:

$$\Phi^{Y_l Y_l} = |\Gamma^{m,l}|^2 \cdot \Phi^{D_m D_m} + |\Theta^{m,l}|^2 \cdot \Phi^{S_m S_m}. \quad \text{Eq. (42)}$$

Eq. (42) shows that the $l^{th}$ microphone auto-PSD may be written as a function of the echo signal and near-end signal PSDs of the $m^{th}$ microphone, i.e. $\Phi^{D_m D_m}$ and $\Phi^{S_m S_m}$ to be estimated.

Considering all the M microphone signals, Eq. (42) may equivalently be written in a matrix form as follows:

$$\begin{bmatrix} \Phi^{Y_1 Y_1} \\ \Phi^{Y_2 Y_2} \\ \vdots \\ \Phi^{Y_M Y_M} \end{bmatrix} = \begin{bmatrix} |\Gamma^{m,1}|^2 & |\Theta^{m,1}|^2 \\ |\Gamma^{m,2}|^2 & |\Theta^{m,2}|^2 \\ \vdots & \vdots \\ |\Gamma^{m,M}|^2 & |\Theta^{m,M}|^2 \end{bmatrix} \cdot \begin{bmatrix} \Phi^{D_m D_m} \\ \Phi^{S_m S_m} \end{bmatrix} \quad \text{Eq. (43)}$$

$$Z = A \cdot V \quad \text{Eq. (44)}$$

With the following notations $$Z = [\Phi^{Y_1 Y_1} \quad \Phi^{Y_2 Y_2} \quad \ldots \quad \Phi^{Y_M Y_M}]^T,$$

$$A = \begin{bmatrix} |\Gamma^{m,1}|^2 & |\Theta^{m,1}|^2 \\ |\Gamma^{m,2}|^2 & |\Theta^{m,2}|^2 \\ \vdots & \vdots \\ |\Gamma^{m,M}|^2 & |\Theta^{m,M}|^2 \end{bmatrix},$$

$$V = \begin{bmatrix} \Phi^{D_m D_m} \\ \Phi^{S_m S_m} \end{bmatrix}$$

which represents the PSDs required for the computation of the echosuppression gains for the $m^{th}$ microphone path.

From Eq. (44), an estimate of V may be derived as:

$$\hat{V} = (A^H A)^{-1} A^H Z. \quad \text{Eq. (45)}$$

The expansion of Eq. (45) leads to the following echo and near-end PSD estimates:

$$\hat{\Phi}^{D_m D_m} = \frac{\sum_{l=1, l \neq m}^{M} (|\Theta^{m,l}|^2 - |\Gamma^{m,l}|^2) \cdot (|\Theta^{m,l}|^2 \cdot \Phi^{Y_m Y_m} - \Phi^{Y_l Y_l})}{\sum_{l=1, l \neq m}^{M} (|\Theta^{m,l}|^2 - |\Gamma^{m,l}|^2)^2} \quad \text{Eq. (46)}$$

$$\hat{\Phi}^{S_m S_m} = \frac{\sum_{l=1, l \neq m}^{M} (|\Theta^{m,l}|^2 - |\Gamma^{m,l}|^2) \cdot (\Phi^{Y_l Y_l} - |\Gamma^{m,l}|^2 \cdot \Phi^{Y_m Y_m})}{\sum_{l=1, l \neq m}^{M} (|\Theta^{m,l}|^2 - |\Gamma^{m,l}|^2)^2} \quad \text{Eq. (47)}$$

PSD estimates match Eqs. (17) and (18) for M=2.

By introducing the RTFs defined in Eq. (41) in Eq. (39), the following may be written:

$$Y_l = \Gamma^{m,l} \cdot H_m \cdot X + \Theta^{m,l} \cdot G_m \cdot S = \Gamma^{m,l} \cdot D_m + \Theta^{m,l} \cdot S_m \quad \text{Eq. (48)}$$

Eq. (48) shows that the $l^{th}$ microphone signal may be written as a function of the echo signal and near-end signals received by the $m^{th}$ microphone channel.

Considering all the M microphone observations, Eq. (48) may equivalently be written in a matrix form as follows:

$$\begin{bmatrix} Y_1 \\ Y_2 \\ \vdots \\ Y_M \end{bmatrix} = \begin{bmatrix} \Gamma^{m,1} & \Theta^{m,1} \\ \Gamma^{m,2} & \Theta^{m,2} \\ \vdots & \vdots \\ \Gamma^{m,M} & \Theta^{m,M} \end{bmatrix} \cdot \begin{bmatrix} D_m \\ S_m \end{bmatrix} \quad \text{Eq. (49)}$$

$$Y = A \cdot V \quad \text{Eq. (50)}$$

From Eq. (49), the microphone PSD matrix may be computed as follows:

$$\Phi^{YY} = A\Phi^{VV}A^H \qquad \text{Eq. (51)}$$

Where $\Phi^{YY} = Y \cdot Y^H$ is an estimate of the microphone power spectrum matrix $$\Phi^{YY} = V \cdot V^H = \begin{bmatrix} \Phi^{D_m D_m} & \Phi^{D_m S} \\ \Phi^{D_m S*} & \Phi^{S_m S_m} \end{bmatrix}$$

contains the PSDs of interest $\Phi^{D_m D_m}$ and $\Phi^{S_m S_m}$. An estimate of $\Phi^{VV}$ is given by $$\hat{\Phi}^{VV} = (A^H A)^{-1} A^H \Phi^{YY} A (A^H A)^{-1} \qquad \text{Eq. (52)}$$

The expansion of Eq. (52) leads to the following echo and near-end PSD estimates:

$$\Phi^{D_m D_m} = \frac{\sum_{l=1, l\neq m}^{M} |\Theta^{m,l} - \Gamma^{m,l}|^2 (|\Theta^{m,l}|^2 \Phi^{Y_m Y_m} + \Phi^{Y_l Y_l} - \text{Re}\{\Theta^{m,l} \Phi^{Y_m Y_l}\})}{\left(\sum_{l=1, l\neq m}^{M} |\Theta^{m,l} - \Gamma^{m,l}|^2\right)^2} \qquad \text{Eq. (53)}$$

$$\Phi^{S_m S_m} = \frac{\sum_{l=1, l\neq m}^{M} |\Theta^{m,l} - \Gamma^{m,l}|^2 (|\Gamma^{m,l}|^2 \Phi^{Y_m Y_m} + \Phi^{Y_l Y_l} - 2\text{Re}\{\Gamma^{m,l} \Phi^{Y_m Y_l}\})}{\left(\sum_{l=1, l\neq m}^{M} |\Theta^{m,l} - \Gamma^{m,l}|^2\right)^2} \qquad \text{Eq. (54)}$$

The PSD estimates may require the knowledge of the microphone signals auto-PSD. In a real time implementation, an estimate of the microphone signals may be obtained through auto-regressive smoothing.

The PSD estimates may be valid for the case where none of the microphone signals is processed by an adaptive filter before being used by the postfilter.

In another example, the adaptive filter may be placed on some or on all of the microphone paths before the postfilter. The use of an adaptive filter on the $m^{th}$ microphone path means that in the above equations $y_m(n)$ becomes $e_m(n)$ with $$e_m(n) = g_m(n) * s(n) + \tilde{h}_m(n) * x(n). \qquad \text{Eq. (55)}$$

RTF Estimation may be provided. For example, least square estimate of the near-end RTF may be used. Assuming near-end only activity periods and the presence of some local noise in the near-end acoustic environment, the $l^{th}$ microphone signal may be written as follows:

$$y_l(n) = g_l(n) * s(n) + b_l(n), \qquad \text{Eq. (56)}$$

or equivalently in the frequency domain:

$$Y_l = H_l \cdot X + B_l \qquad \text{Eq. (57)}$$

where $b_l(n)$ represents the ambient noise received by the $l^{th}$ microphone and $B_l$ is its Fourier transform.

By introducing the near-end RTF definition as defined in Eq. (41) into Eq. (57), the following may be obtained:

$$Y_l = \Theta^{m,l} \cdot Y_m + B_l - \Theta^{m,l} \cdot B_m = \Theta^{m,l} \cdot Y_m + \tilde{B}_l \qquad \text{Eq. (58)}$$

The least square estimate of the near-end RTF may be derived as follows:

$$\hat{\Theta}_{LS}^{m,l} = \frac{\langle \Phi_{(r)}^{Y_m Y_m} \Phi_{(r)}^{Y_l Y_m} \rangle - \langle \Phi_{(r)}^{Y_m Y_m} \rangle \langle \Phi_{(r)}^{Y_l Y_m} \rangle}{\langle (\Phi_{(r)}^{Y_m Y_m})^2 \rangle - \langle \Phi_{(r)}^{Y_m Y_m} \rangle^2} \qquad \text{Eq. (59)}$$

where $$\langle \beta_{(r)} \rangle = \frac{1}{R} \sum_{k=1}^{R} \beta_{(r)}$$

given a set of R measures of $\beta$ along time.

Least square estimate of the Echo RTF may be provided. Assuming far-end only activity periods and the presence of some local noise in the near-end acoustic environment, the $l^{th}$ microphone signal may be written as follows:

$$y_l(n) = h_l(n) * x(n) + b_l(n), \qquad \text{Eq. (60)}$$

or equivalently in the frequency domain:

$$Y_l = H_l \cdot X + B_l \qquad \text{Eq. (61)}$$

By introducing the echo RTF definition as defined in Eq. (60) into Eq. (61), the following may be obtained:

$$Y_l = \Gamma^{m,l} \cdot Y_m + B_l - \Gamma^{m,l} \cdot B_m = \Gamma^{m,l} \cdot Y_m + \tilde{B}_l \qquad \text{Eq. (62)}$$

The vector $[X\ Y_1 \ldots Y_M]^T$ and an observation window which may be subdivised into R frames in the time domain may be considered. Considering the echo RTF is stationary within the observation window, non-stationary of speech signals may be exploited from one frame to another. For each frame r of the observation interval, the following PSD may be written:

$$\Phi_{(r)}^{Y_l X} = \Gamma^{m,l} \cdot \Phi_{(r)}^{Y_m X} + \Phi_{(r)}^{\tilde{B}_l X}. \qquad \text{Eq. (63)}$$

$\tilde{B}_l$ is defined by the ambient noise in the near-end acoustic environment, therefore it may be assumed that it is statistically independent from the loudspeaker (i.e. $\Phi_{(r)}^{\tilde{B}_l X} = 0$). The quantities $\Phi_{(r)}^{Y_l X}$ and $\Phi_{(r)}^{XX}$ may be estimated from observations signals through autoregressive smoothing for example. Considering the observation interval of R frames, Eq. (63) may be written in a matrix form as follows:

$$\begin{bmatrix} \Phi_{(1)}^{Y_l X} \\ \Phi_{(2)}^{Y_l X} \\ \vdots \\ \Phi_{(R)}^{Y_l X} \end{bmatrix} = \begin{bmatrix} \Phi_{(1)}^{Y_m X} \\ \Phi_{(2)}^{Y_m X} \\ \vdots \\ \Phi_{(R)}^{Y_m X} \end{bmatrix} \cdot [\Gamma^{m,l}] \qquad \text{Eq. (64)}$$

$$Z = A \cdot V \qquad \text{Eq. (65)}$$

Then the LS estimate of the echo RTF defines as follows:

$$\langle \beta_{(r)} \rangle = \frac{1}{R} \sum_{k=1}^{R} \beta_{(r)}$$

and expresses as follows:

$$\hat{\Gamma} = \underset{\hat{\Gamma}}{\mathrm{argmin}}\left((Z-\hat{Z})^H \cdot (Z-\hat{Z})\right) \text{ with } \hat{Z} = A \cdot \hat{V} \qquad \text{Eq. 66}$$

where $$\hat{\Gamma}_{LS}^{m,l} = (A^H A)^{-1} A^H Z = \frac{\left\langle \Phi_{(r)}^{Y_l X} \Phi_{(r)}^{Y_m X} \right\rangle}{\left\langle \left(\Phi_{(r)}^{Y_m X}\right)^2 \right\rangle} \qquad \text{Eq. 67}$$

given a set of R measures of β along time.

The performance of the dual microphone residual echo PSD estimate described above may be assessed and compared against an existing estimate.

For example, the data recorded with the mock-up phone as previously discussed may be used to generate a test database of speech signals. The microphone signals may contain both echo-only and double-talk periods. The signal-to-echo ratio (SER) may be set and measured for the primary microphone and the secondary microphone may be computed accordingly. The SER may range from −5 dB to 10 dB. The dual channel (DC) echo processing method, for example, the method of FIGS. 1 and 2, may be compared to an existing single channel (SC) echo processing method (i.e SC adaptive filter followed by a postfilter). The SC echo processing may only use the primary microphone. The adaptive filter considered may be a normalized least mean square adaptive filter with variable stepsize. For the DC and SC echo postfilters considered, the subband gains may be computed with a Wiener rule with SER estimated through decision directed approach. The DC and SC postfilters may differ by the residual echo PSD estimator.

The assessment of the postfilter for the dual channel (DC) echo processing method may be performed in two steps. On one side, the PSD estimator for the dual channel (DC) echo processing method may be assessed in terms of symmetric segmental logarithmic error which may be expressed as follows:

$$\log Err = \frac{1}{KM} \sum_k^K \sum_i^M \left| 10\log_{10}\left[\frac{\Phi^{d_p d_p}(k,i)}{\hat{\Phi}^{d_p d_p}(k,i)}\right]\right| \qquad \text{Eq. 68}$$

where K represents the number of frames.

On the other side, the DC postfilter may be compared to the SC postfilter in terms of echo return loss enhancement (ERLE), of speech attenuation (SA), of cepstral distance (CD) and of informal listening tests. The ERLE may represent an amount of echo suppression achieved by the adaptive filter and by the postfilter all together and may be measured during echo-only periods. The SA may be used to measure the amount of speech attenuation introduced by the postfilter on the near-end speech signal during double-talk periods. The SA may be measured for the primary microphone as the attenuation between the clean speech $s_p(n)$ 607 and a weighted speech signal $\bar{s}_p(n)$ as follows:

$$SA = \frac{1}{\mathbb{K}} \sum_{\lambda}^{\mathbb{K}} 10\log_{10} \frac{\sum_{l=1}^{L} s_p^2(\lambda L + l)}{\sum_N \bar{s}_p^2(\lambda L + l)} \qquad \text{Eq. 69}$$

where L is length of the frames on which may compute the segmental SA and $\mathbb{K}$ represents the number of frames during which double talk occurs.

The weighted speech signals $\bar{s}_p(n)$ may be obtained with any suitable existing method. When processing degraded speech signals, the updated spectral gains may be stored. These gains may be applied to the clean near-end speech $s_p(n)$ in the subband domain to obtain the weighted speech signal $\bar{s}_p(n)$. The cepstral distance may be similarly measured between $s_p(n)$ and $\bar{s}_p(n)$. It should be appreciated that there may be no need to assess the adaptive filtering part separately as the same adaptive filter for DC and SC echo processing may be used.

For example, the number of subbands M may be set to 256 and the subband conversion may take place through short term Fourier transform with overlap add.

Figure 12A:
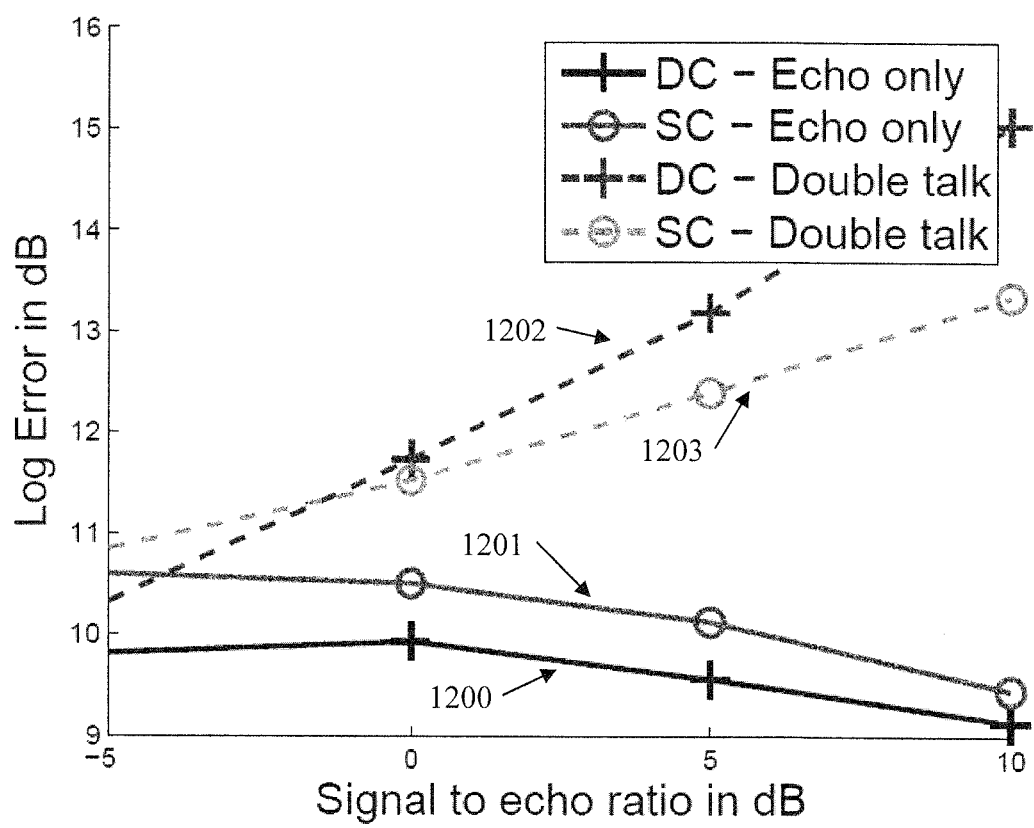
FIG. 12(a) shows the estimation error on the residual echo power spectral density (PSD) during echo-only and double-talk periods.

Residual echo PSD estimate assessment may be performed. FIG. 12(a) shows the estimation error on the residual echo PSD during echo-only and double-talk periods. FIG. 12(a) shows that during echo-only period the DC estimate 1200 slightly outperforms the SC estimate 1201. For both the DC estimates 1200, 1202 and SC estimates 1201, 1203, the error decreases as the SER increases although it may be observed that this decrease is gradual and very slow.

FIG. 12(a) further shows that during double-talk periods, the error increases with the SER. This may be explained by the presence of near-end speech signal which disturbs the PSD estimation. Moreover, high SERs may imply high near-end speech signal compared to echo (and therefore residual echo) and therefore more disturbance of the residual echo estimators. From FIG. 12(a), the DC estimate can also be seen to achieve better performance than the SC estimate for low SERs. In the contrary at high SER (SER>0 dB), the SC estimate may outperform the DC estimator. The loss of performance of the DC may be justified by the fact that during double-talk, the presence of near-end may disturb the estimate of the RTF Γ as the cross-PSDs used for its computation in practice may contain a component dependent of the near-end speech signal.

Residual echo suppression may be provided.

Figure 12B:
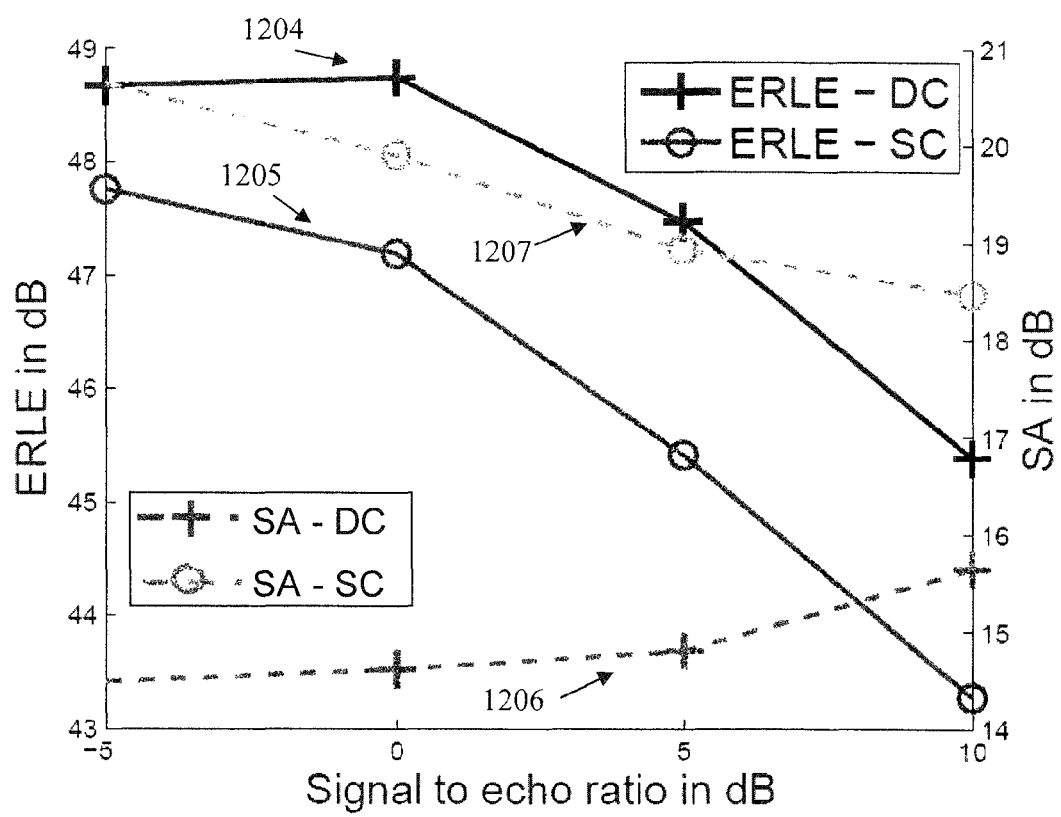
FIG. 12(b) shows the echo return loss enhancement (ERLE) curves and speech attenuation (SA) curves.
Figure 12C:
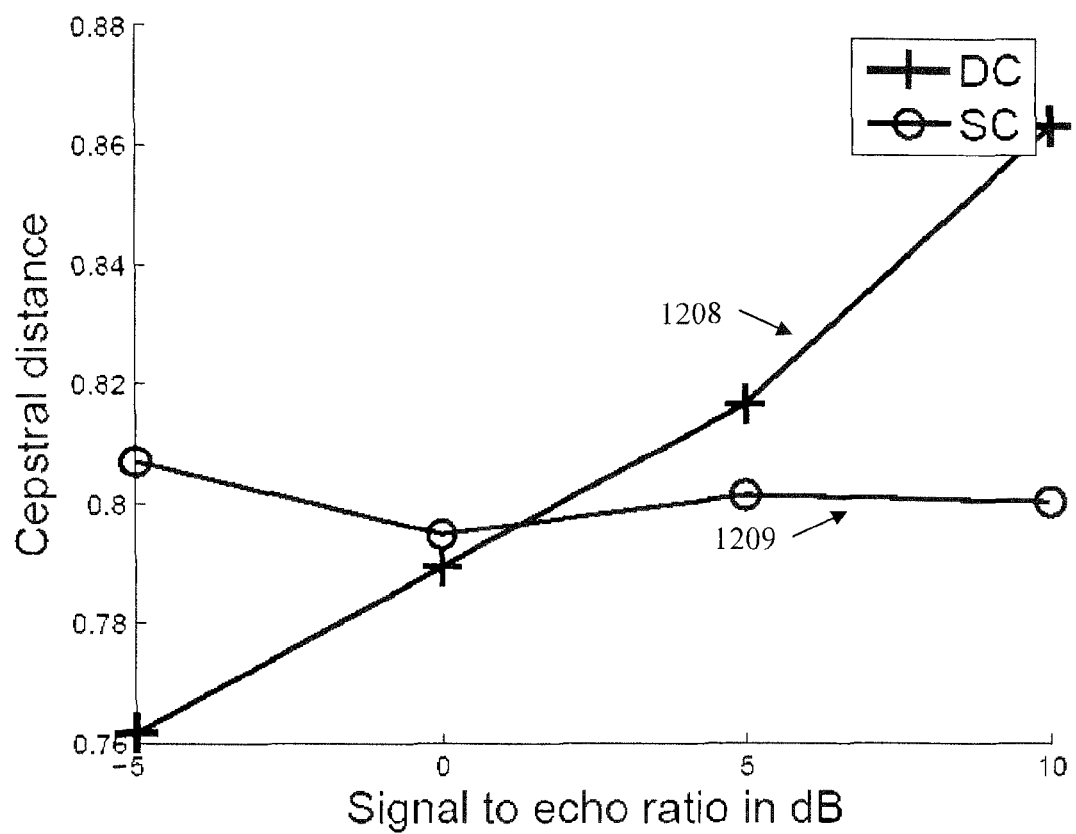
FIG. 12 (c) shows the measure of cepstral distance during double talk.

FIG. 12(b) shows the ERLE curves 1204, 1205 and SA curves 1206, 1207. The ERLE curves 1204, 1205 shows that the DC echo postfilter 1204 achieves more echo suppression than the SC postfilter 1205. This may be a direct consequence of PSDs estimators accuracy during echo-only periods. The SA curves 1206, 1207 show that the SA for the DC case 1206 increases with the SER while it decreases for the SC case 1207. Such increase of the SA may be an undesirable effect. Nevertheless, the DC postfilter may introduce less attenuation (up to 5 dB) of the near-end speech compared to the SC postfilter which is a very significant difference when dealing with echo cancellation FIG. 12(c) shows the measure of cepstral distance during double talk. FIG. 12 (c) shows that at low SERs, the DC postfilter 1208 introduces less distortions than the SC postfilter 1209. At higher SERs, the SC postfilter 1209 introduces less distortions. The measure of ceptral distance may be a consequence of the PSD estimations errors.

Moreover, the DC postfilter 1208 may introduce less near-end speech attenuation during double-talk than the SC postfilter 1209. In the DC case 1208, the speech attenuation increases with the SER while it decreases for the SC case 1209. This difference of behaviour in the speech attenuation may directly reflect on the cepstral distance and may explain its increase for the DC case 1208. Informal listening tests may show that the DC postfilter 1208 yields a slight better intelligibility compared to the SC postfilter 1209 during double-talk periods. The SA introduced by the SC postfilter 1209 may be perceptible and may sometimes lead to complete suppression of the speech.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing audio signals, the method comprising:
    outputting an audio signal;
    receiving the output audio signal via a first receiving path as a first received audio signal;
    receiving the output audio signal via a second receiving path as a second received audio signal;
    determining a residual echo power based on the first received audio signal and the second received audio signal;
    determining an echo suppression gain based on the residual echo power and an estimate of a signal-to-echo ratio of at least a selected received audio signal from the first received audio signal and the second received audio signal; and
    filtering echo suppression of the audio signal based on the first received audio signal and the echo suppression gain.

2. The method of claim 1, wherein determining an echo suppression gain based on the first audio signal comprises:
    filtering echo of the first audio signal to produce a first echo error signal;
    determining the echo suppression gain based on the first echo error signal; and
    filtering echo suppression of the audio signal based on the first echo error signal.

3. The method of claim 1, wherein determining an echo suppression gain based on the second audio signal comprises:
    filtering echo of the second audio signal to produce a second echo error signal; and
    determining the echo suppression gain based on the second echo error signal.

4. The method of claim 2, wherein the filtering of echo comprises an adaptive echo filtering.

5. The method of claim 1, wherein the filtering echo suppression of the audio signal includes ignoring the second received audio signal.

6. The method of claim 1, wherein outputting an audio signal comprises outputting an audio signal via a loudspeaker.

7. The method of claim 1, wherein receiving the audio signal via a first receiving path as a first audio signal comprises receiving the audio signal via a first microphone; and wherein receiving the output audio signal via a second receiving path as a second received audio signal comprises receiving the output audio signal via a second microphone.

8. The method of claim 1, further comprising: beamforming at least one of the audio signal and the audio signal after echo suppression.

9. A method for processing audio signals, the method comprising:
    outputting an audio signal;
    determining an echo suppression gain based on a multichannel audio signal information representing received audio signals which are received via different receiving paths; wherein determining the echo suppression gain is based on an estimate of at least a signal-to-echo ratio of a selected set of received audio signals of the received audio signals and a second echo error signal of the received signal not selected for the estimate of the signal-to-echo ratio; and
    filtering echo suppression of the audio signal based on single-channel audio signal information representing the received audio signal received via a single receiving path and the determined echo suppression gain.

10. The method of claim 9, further comprising: wherein the multichannel audio signal information comprises echo filtering information of the received audio signals.

11. The method of claim 9, further comprising: wherein the multichannel audio signal information comprises multichannel echo filtering information of the received audio signals.

12. The method of claim 9, further comprising: wherein the filtering of echo comprises an adaptive echo filtering.

13. The method of claim 9, wherein outputting an audio signal comprises outputting an audio signal via a loudspeaker.

14. The method of claim 9, wherein the received audio signals are received via at least a first microphone and a second microphone.

15. The method of claim 9, further comprising: beamforming at least one of the audio signal and the audio signal after echo suppression.

16. A circuit arrangement for processing audio signals comprising:
    an audio device for outputting an audio signal;
    a first receiving path configured to receive the output audio signal as a first received audio signal;
    a second receiving path configured to receive the output audio signal as a second received audio signal;
    a determiner circuit configured to determine a residual echo power based on the first received audio signal and the second received audio signal; wherein the determiner circuit is further configured to determine an echo suppression gain based on the residual echo power and an estimate of at least a signal-to-echo ratio of a selected received audio signal from the first received audio signal and the second received audio signal; and
    an echo suppression filter coupled to the first receiving path and the determiner circuit configured to suppress echo of the audio signal based on the first received audio signal and the echo suppression gain.

17. The circuit arrangement of claim 16, further comprising: at least one echo filter configured to filter the first received audio signal to produce a first echo error signal; the determiner circuit configured to determine the echo suppression gain based on the first echo error signal; and the echo suppression filter configured to perform echo suppression of the audio signal based on the first echo error signal.

18. The circuit arrangement of claim 17, further comprising: at least one echo filter configured to filter the second audio signal to produce a second echo error signal; the determiner circuit configured to determine the echo suppression gain based on the second echo error signal.

19. The circuit arrangement of claim 17, wherein the at least one echo filter comprises an adaptive echo filter.

20. The circuit arrangement of claim 16, the echo suppression filter configured to ignore the second received audio signal when filtering the audio signal based on the first echo error signal.

21. The circuit arrangement of claim 16, further comprising: a loudspeaker connected to the audio signal output.

22. The circuit arrangement of claim 16, further comprising: a first microphone connected to the first receiving path; and a second microphone connected to the second receiving path.

23. The circuit arrangement of claim 16, further comprising: a beamformer configured to beamform the audio signals or the echo suppression filtered audio signal or both.

24. A circuit arrangement for processing audio signals, the circuit arrangement comprising:
an audio device for outputting an audio signal;
a plurality of receiving paths coupled to the audio signal output;
a determiner circuit configured to determine a residual echo power based on a plurality of received audio signals; wherein the determiner circuit is coupled to the plurality of receiving paths and further configured to determine an echo suppression gain based on at least a selected plurality of received audio signals of the received audio signals; wherein the echo suppression gain is based on the residual echo power, an estimate of a signal-to-echo ratio of the first received audio signal, and a second echo error signal of the received signal not selected for the estimate of the signal-to-echo ratio; and
an echo suppression filter coupled to at least one of the plurality of receiving paths and the determiner circuit and configured to filter the audio signal based on a single-channel audio signal information representing a received audio signal received via a single receiving path and the echo suppression gain.

25. The circuit arrangement of claim 24, wherein the multichannel audio signal information comprises echo filtering information of the plurality of audio signals.

26. The circuit arrangement of claim 24, wherein the multichannel audio signal information comprises multichannel echo filtering information of the plurality of audio signals.

27. The circuit arrangement of claim 24, wherein the at least one echo filter comprises an adaptive echo filter.

28. The circuit arrangement of claim 24, further comprising: a loudspeaker connected to the audio signal output.

29. The circuit arrangement of claim 24, further comprising: a first microphone connected to one receiving path of the plurality of receiving paths;
and a second microphone connected to another receiving path of the plurality of receiving paths.

30. The circuit arrangement of claim 24, further comprising: a beamformer configured to beamform the audio signals or the echo suppression filtered audio signal or both.

31. The method of claim 1, wherein determining echo suppression gain is also based on a second echo error signal of the received signal not selected for the estimate of the signal-to-echo ratio.

* * * * *